US012462391B2

(12) United States Patent
Zhu et al.

(10) Patent No.: US 12,462,391 B2
(45) Date of Patent: Nov. 4, 2025

(54) PATIENT-SPECIFIC AUTO-SEGMENTATION IN ONLINE ADAPTIVE RADIOTHERAPY

(71) Applicant: Siemens Healthineers International AG, Steinhausen (CH)

(72) Inventors: Simeng Zhu, Troy, MI (US); Supratik Bose, San Ramon, CA (US)

(73) Assignee: Siemens Healthineers International AG, Steinhausen (CH)

( * ) Notice: Subject to any disclaimer, the term of this patent is extended or adjusted under 35 U.S.C. 154(b) by 385 days.

(21) Appl. No.: 17/990,105

(22) Filed: Nov. 18, 2022

(65) Prior Publication Data
US 2024/0169543 A1    May 23, 2024

(51) Int. Cl.
*G06T 7/11*    (2017.01)
*A61N 5/10*    (2006.01)

(52) U.S. Cl.
CPC .............. *G06T 7/11* (2017.01); *A61N 5/1039* (2013.01); *G06T 2200/24* (2013.01); *G06T 2207/10081* (2013.01); *G06T 2207/10088* (2013.01); *G06T 2207/20081* (2013.01); *G06T 2207/20092* (2013.01); *G06T 2207/30004* (2013.01)

(58) Field of Classification Search
None
See application file for complete search history.

(56) References Cited

U.S. PATENT DOCUMENTS

| 11,176,677 | B2 | 11/2021 | Fuchs et al. | |
|---|---|---|---|---|
| 2007/0081712 | A1* | 4/2007 | Huang | G06T 7/155 382/128 |
| 2020/0364913 | A1* | 11/2020 | Bradski | G06T 7/11 |
| 2021/0100526 | A1* | 4/2021 | Schein | A61B 8/5215 |
| 2021/0225003 | A1* | 7/2021 | Wang | G06V 10/26 |
| 2021/0295528 | A1* | 9/2021 | Fuchs | G06V 10/751 |
| 2022/0180524 | A1* | 6/2022 | Novosad | G06T 7/149 |
| 2022/0270357 | A1* | 8/2022 | Goyal | G06T 7/194 |

OTHER PUBLICATIONS

Wenhao et al, "Interactive Medical Image Segmentation with Self-Adaptive Confidence Calibration", Nov. 15, 2021, arXiv:2111.07716, pp. 1-24 (Year: 2021).*
Bai et al., A Proof-of-Concept Study of Artificial Intelligence Assisted Contour Revision. Medical Artificial Intelligence and Automation (MAIA) Laboratory, Department of Radiation Oncology, University of Texas Southwestern Medical Center, Dallas, Texas 75390 *Corresponding Author: Steve. Jiang@UTSouthwestern.edu.

(Continued)

*Primary Examiner* — Beniyam Menberu
(74) *Attorney, Agent, or Firm* — Foley & Lardner LLP

(57) ABSTRACT

Disclosed herein are systems and methods for adaptively training machine learning models for auto-segmentation of medical images. A system executes a segmentation model that receives a medical image as input and generates an initial segmentation of the medical image for a radiotherapy treatment. The system identifies a corrected segmentation corresponding to the initial segmentation generated in response to an input at a user interface presenting the initial segmentation. The system fine-tunes the segmentation model based on the medical image and the corrected segmentation to generate a fine-tuned segmentation model.

18 Claims, 13 Drawing Sheets

(56) References Cited

OTHER PUBLICATIONS

Bredell et al., Iterative Interaction Training for Segmentation Editing Networks. Computer Vision Laboratory, ETH Zurich, Zurich, Switzerland gbredell@student.ethz.ch.

Chun J, Park JC Olberg S, Zhang Y, Nguyen D, Wang J, Kim JS, Jiang S. International deep overfit learning (IDOL): A novel deep learning strategy for adaptive radiation therapy. Med Phys.2022:49:488-496. https://doi.org/10.1002/mp.15352.

Lei et al., DeeplGeoS-V2: Deep Interactive Segmentation of Multiple Organs from Head and N eek Images with Lightweight CNNs, 1 School of Mechanical and Electrical Engineering, University of Electronic Science and Technology of China, Chengdu, China guotai.wang@uestc.edu.cn 2 Department of Radiation Oncology, Sichuan Cancer Hospital and Institute, University of Electronic Science and Technology of China, Chengdu, China.

Wang et al., Interactive Medical Image Segmentation Using Deep Learning With Image-Specific Fine Tuning. IEEE Transactions On Medical Imaging, vol. 37, No. 7, Jul. 2018.

\* cited by examiner

US 12,462,391 B2

PATIENT-SPECIFIC AUTO-SEGMENTATION IN ONLINE ADAPTIVE RADIOTHERAPY

TECHNICAL FIELD

This application relates generally to machine learning to automatically and adaptively segment medical images.

BACKGROUND

Radiotherapy (radiation-based therapy) is used as a cancer treatment to emit high doses of radiation that can kill cells or shrink a tumor. Radiotherapy is carefully applied to patients in order to specifically target tumors while minimizing damage to healthy organs and tissue. Medical imaging techniques, such as magnetic resonance imaging (MRI) and computed tomography (CT) scans can be used to identify the size and location of tumors to guide radiotherapy. Medical images captured from radiology machines can be segmented by physicians to delineate anatomical areas of interest depicted in the medical images. Accurate segmentation is important because the segmented regions are used to assist in defining radiation therapies for the imaged regions.

Machine learning models can be used to assist the process of image segmentation, where a physician can refine the output of the machine learning model to accurately assign labels to areas of interest in the medical images. However, such auto-segmentation techniques may rely on static machine learning models with fixed parameters. When static models are utilized in a clinical setting, additional corrections to organ contours are required due to differences between individual patients and the cases used to train the static model. These differences may include patient-specific factors (e.g., disease characteristics) and oncologist style, and may lead to different ways to contour the same structure for different patients by different oncologists. These differences are compounded in adaptive radiotherapy, where segmentation may be performed several times during the course of multi-fraction adaptive radiotherapy. For each segmentation process, physicians must manually and consistently correct segmentation mistakes produced by the static machine learning models.

SUMMARY

For the aforementioned reasons, there is a desire for a system that can automatically improve the accuracy of the auto-segmentation process on a per-patient basis in response to physician input. To overcome the deficiencies described above, it is desirable to iteratively train a segmentation model "online," or after the model has been deployed to a physician, to adapt to specific patient anatomy and learn from contour editing cues provided from prior adaptive treatment sessions. These corrections can be used as ground-truth data to fine-tune a baseline segmentation model to reflect the patient-specific factors not captured by the cohort used to train the baseline segmentation model. This approach enables continuous improvement of the auto-segmentation results and therefore reduces the time needed for manual correction as the patient progresses through treatment.

In one embodiment, a method comprises executing a segmentation model that receives a medical image of a patient as an input and generates an initial segmentation of the medical image for a radiotherapy treatment of the patient; identifying a corrected segmentation of the patient and corresponding to the initial segmentation generated in response to an input at a user interface presenting the initial segmentation; and fine-tuning the segmentation model for the patient based on the medical image and the corrected segmentation to generate a fine-tuned segmentation model.

The method may include executing the fine-tuned segmentation model to generate a second segmentation of a second image; and fine-tuning the fine-tuned segmentation model based on the second image and a second corrected segmentation corresponding to the second segmentation.

The method may include training a second model that generates refined segmentations based on interaction data; and executing, by the one or more processors, the second model to generate a refined segmentation of the medical image based on the initial segmentation and the input at the user interface.

The method may include generating, by the one or more processors, a hint map based on the input at the user interface. The second model may generate the refined segmentation of the medical image based on the initial segmentation and the hint map.

The method may include executing the fine-tuned segmentation model to generate a second segmentation of a second image; and fine-tuning the second model based on the second segmentation and a second input at the user interface.

The input at the user interface may comprise a modification of the initial segmentation.

The medical image may be a radiology image of an anatomy of the patient. The medical image may be a first radiology image of an anatomy of the patient, and the second image may be a second radiology image of the anatomy of the patient.

The method may include generating the user interface that presents the initial segmentation responsive to executing the segmentation model.

The method may include generating the corrected segmentation in response to the input at the user interface indicating a refinement.

In another embodiment, a system comprises one or more processors coupled to a non-transitory memory that are configured to execute a segmentation model that receives a medical image of a patient as an input and generates an initial segmentation of the medical image for a radiotherapy treatment of the patient; identify a corrected segmentation of the patient and corresponding to the initial segmentation generated in response to an input at a user interface presenting the initial segmentation; and fine-tune the segmentation model for the patient based on the medical image and the corrected segmentation to generate a fine-tuned segmentation model.

The one or more processors may be configured to execute the fine-tuned segmentation model to generate a second segmentation of a second image; and fine-tune the fine-tuned segmentation model based on the second image and a second corrected segmentation corresponding to the second segmentation.

The one or more processors may be configured to train a second model that generates refined segmentations based on interaction data; and execute the second model to generate a refined segmentation of the medical image based on the initial segmentation and the input at the user interface.

The one or more processors may be configured to generate a hint map based on the input at the user interface. The second model may generate the refined segmentation of the medical image based on the hint map.

The one or more processors may be configured to execute the fine-tuned segmentation model to generate a second segmentation of a second image; and fine-tune the second model based on the second segmentation and a second input at the user interface.

The input at the user interface may comprise a modification of the initial segmentation.

The medical image may comprise a radiology image of an anatomy of the patient. The medical image may be a first radiology image of an anatomy of the patient, and the second image may be a second radiology image of the anatomy of the patient.

The one or more processors may be configured to generate the user interface that presents the initial segmentation responsive to executing the segmentation model.

The one or more processors may be configured to generate the corrected segmentation in response to the input at the user interface indicating a refinement.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
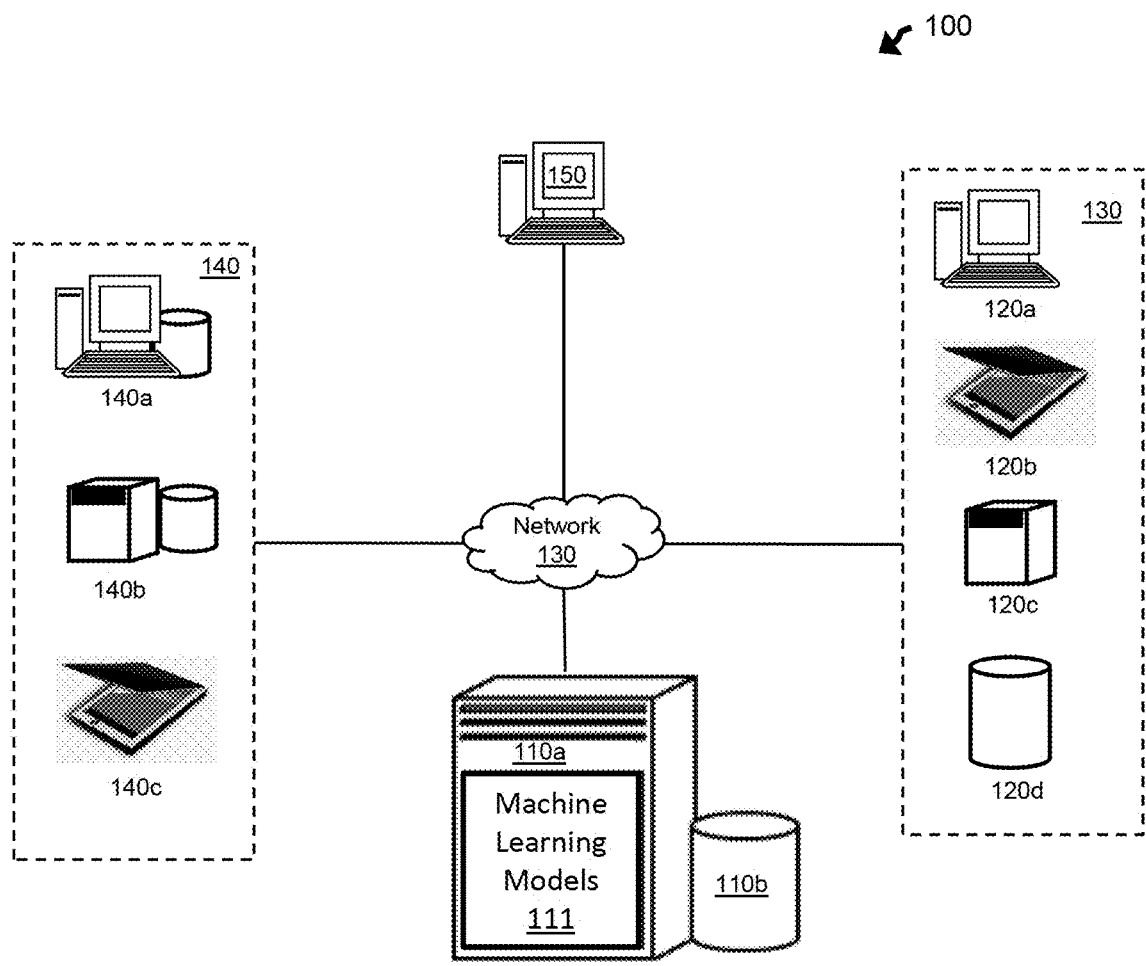
FIG. 1 illustrates components of a machine learning system that adaptively trains machine learning models for auto-segmentation of medical images, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Image segmentation is a part of radiotherapy workflows in which contours are drawn to delineate anatomical regions of interest, such as tumor volumes or organs at risk. Segmentation can be performed manually by a physician, who can manually draw the contours on the medical image using software. Segmentation may also be performed in part using artificial intelligence models, which can be trained to receive medical images as input and generate output contours for the image that correspond to regions of interest. After generation, a physician can manually refine the generated contours to ensure accuracy. The generated contours can be used to guide future radiotherapy treatment for the patient.

While machine learning models can be utilized to produce segmentations of medical images to improve the efficiency of radiotherapy workflow, these models are static models that cannot adapt to variations between patients or physician preferences. Segmentations are individual labeled regions of a medical image; including boundaries that indicate a region of interest. The segmentations can indicate a three-dimensional region or a two-dimensional region, depending on the type of medical image. The use of static models requires the physician to make additional corrections to organ contours. As static models utilize a set of training images produced from patients that are different from the patients that the model serves in a clinical setting, the static models cannot be sufficiently accurate and will require manual input. Variations between patients that can affect the accuracy of segmentation include patient-specific factors, disease characteristics, and oncologist segmentation style. In adaptive radiotherapy, where segmentation is performed several times during the course of multi-fraction adaptive radiotherapy, physicians must repeatedly make the same corrections to errors produced by the static models for each segmentation, which reduces the efficiency of radiotherapy workflow.

The systems and methods described herein overcome these limitations by adaptively training machine learning models for auto-segmentation of medical images "online" (e.g., during the course of patient treatment). This results in trained segmentation models that are patient-specific, physician-specific, or condition-specific for patients with multiple different conditions. The techniques described herein can be used to iteratively train segmentation models to adapt to specific patient anatomy and learn from contour editing cues provided from prior adaptive treatment sessions. During training, corrections provided by a physician can be used as ground-truth data to fine-tune the baseline segmentation models to reflect the patient-specific factors not captured by the cohort used to train the baseline segmentation model. Over multiple sessions, the fine-tuned models show continuous improvement of segmentation results, which reduces the time needed for manual correction by a physician as the patient progresses through treatment.

The system can begin using a trained baseline segmentation model, which can perform segmentation when a radiologic image of a patient is provided as an input. The baseline segmentation model can be trained using a generic dataset. After the initial training is done, the system can adapt baseline segmentation model to each patient. To adaptively train the segmentation model, the system can execute the baseline segmentation model using a first medical image as input, which generates an initial segmentation of the first medical image. A physician can then make corrections to the initial segmentation to generate a refined segmentation for the first medical image. The corrections are recorded and stored in association with the first medical image.

The system can then fine-tune the baseline model for the patient using the first medical image and the refined segmentation produced in part by the physician as additional ground truth. Fine-tuning the baseline model can include overfitting the model to data produced from first medical image during training via data augmentation. In an embodiment, fine-tuning the baseline model may include retraining the baseline model based on data produced from the first medical image during training via data augmentation. During the next treatment fraction, the automatic segmentation process can proceed as above using a second medical image of the same patient using the fine-tuned segmentation model to produce a second initial segmentation. The initial segmentation produced by the fine-tuned segmentation model will be closer to the patient anatomy and physician preference than the initial segmentation produced using the baseline model. The physician can then make corrections, if needed, and the model can be fine-tuned again. This process is repeated for each fraction, with the accuracy of the segmentation produced by the fine-tuned model improving with each fraction.

In an embodiment, a second machine learning model can be used to generate refined segmentations based on a hint map generated from physician interactions with a user interface. The second model can be utilized and trained with the segmentation model as described above. The second model can be an interactive segmentation model that receives the radiologic image, initial segmentation, and a hint map generated based on physician corrections as inputs, and generates a refined segmentation of the radiologic image as output. The second model is also adaptive and patient-specific, as described herein.

As will be described below, a server (referred to herein as the analytics server) can adaptively trains machine learning models for auto-segmentation of medical images. In a non-limiting example, the analytics server may execute a segmentation model that receives a medical image as input and generates an initial segmentation, identify a corrected segmentation corresponding to the initial segmentation, and fine-tune the segmentation model based on the medical image and the corrected segmentation to generate a fine-tuned segmentation model. FIG. 1 is an example of components of a system in which the analytics server operates. Various other system architectures that may include more or fewer features may utilize the methods described herein to achieve the results and outputs described herein. Therefore, the system depicted in FIG. 1 is a non-limiting example.

FIG. 1 illustrates components of a system 100 for adaptively training machine learning models for auto-segmentation of medical images, according to an embodiment. The system 100 may include an analytics server 110a, system database 110b, machine learning models 111, electronic data sources 120a-d (collectively electronic data sources 120), end-user devices 140a-c (collectively end-user devices 140), and an administrator computing device 150. Various components depicted in FIG. 1 may belong to a radiotherapy clinic at which patients may receive radiotherapy treatment, in some cases via one or more radiotherapy machines located within the clinic. The above-mentioned components may be connected to each other through a network 130. Examples of the network 130 may include, but are not limited to, private or public local-area-networks (LAN), wireless LAN (WLAN) networks, metropolitan area networks (MAN), wide-area networks (WAN), and the Internet. The network 130 may include wired and/or wireless communications according to one or more standards and/or via one or more transport mediums.

The system 100 is not confined to the components described herein and may include additional or other components, not shown for brevity, which are to be considered within the scope of the embodiments described herein.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The analytics server 110a may generate and display an electronic platform configured to execute machine learning models 111 (including artificial intelligence-based segmentation models) for adaptive training for patient and physician-specific auto-segmentation of medical images. The analytics server 110a may execute various algorithms to automatically generate segmentations of medical images (e.g., MRI scan images or CT scan images, etc.) to assist with radiotherapy. The electronic platform may include graphical user interfaces (GUI) displayed on each electronic data source 120, the end-user devices 140, and/or the administrator computing device 150. An example of the electronic platform generated and hosted by the analytics server 110a may be a web-based application or a website configured to be displayed on different electronic devices, such as mobile devices, tablets, personal computers, and the like. The electronic platform may also include one or more native applications that execute on the end-user devices 140 or the administrator computing device 150 and communicate with the analytics server 110a. The electronic platform may display various analytical information in user interfaces, such as the user interfaces shown in FIGS. 7A-7F. The information displayed by the electronic platform can include, for example, segmentations of medical images generated by the machine learning models 111.

The analytics server 110a may also execute various software components that accept queries or requests from the other computing devices of the system 100, such as the electronic data sources 120, the end-user devices 140, and/or the administrator computing device 150. In a non-limiting example, a physician may access the platform via one or more of the end-user devices 140 to access segmentations generated by the machine-learning models 111, and provide interactions or hint maps that indicate corrections or refinements to the segmentations. The analytics server 110a may execute one or more training algorithms, as described herein, to further train the machine-learning models 111 based on the medical images, segmentations, and physician input. Some examples of the electronic platform displaying segmentations and receiving physician input in FIGS.

7A-7F. The physician may access any information generated or provided by the analytics server 110a, as described herein.

The analytics server 110a may host a website accessible to users operating any of the electronic devices described herein (e.g., end users, medical professionals, maintenance operators, etc.), where the content presented via the various webpages may be controlled based upon each particular user's role or viewing permissions. The analytics server 110a may be any computing device comprising a processor and non-transitory machine-readable storage capable of executing the various tasks and processes described herein. The analytics server 110a may employ various processors such as central processing units (CPU) and graphics processing units (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

The analytics server 110a may execute software applications configured to display the electronic platform (e.g., host a website), which may generate and serve various webpages to each electronic data source 120, end-user devices 140, and/or the administrator computing device 150. Different users may use the website to view and/or interact with displayed content. The analytics server 110a may be configured to require user authentication based upon a set of user authorization credentials (e.g., username, password, biometrics, cryptographic certificate, and the like). The analytics server 110a may access the system database 110b configured to store user credentials, which the analytics server 110a may be configured to reference in order to determine whether a set of entered credentials (purportedly authenticating the user) match an appropriate set of credentials that identify and authenticate the user.

The analytics server 110a may generate and host webpages based upon a particular user's role within the system 100. In such implementations, the user's role may be defined by data fields and input fields in user records stored in the system database 110b. The analytics server 110a may authenticate the user and may identify the user's role by executing an access directory protocol. The analytics server 110a may generate webpage content that is customized according to the user's role defined by the user record in the system database 110b. For example, a particular user may have authorization to access to information generated by the analytics server 110a for a specified set of patients, medical images, or segmentations.

Machine learning models 111 may be stored in the system database 110b and may include baseline segmentation models or various segmentation models that correspond to specific patients, physicians, conditions, or radiotherapy treatments. In various embodiments, machine learning models 111 use one or more deep learning engines to generate segmentations of medical images. Although the machine learning models 111 can include neural networks trained using supervised learning techniques, it should be understood that any alternative and/or additional machine learning model(s) may be used to implement similar learning engines. The deep learning engines can include processing pathways that are trained during a training phase. Once trained, deep learning engines may be executed (e.g., by the analytics server 110a) to generate segmentations of medical images.

As described herein, the analytics server 110a may store machine learning models 111 (e.g., neural networks, convolutional neural networks, random forest models, support vector machines, regression models, recurrent models, etc.) in memory. The analytics server 110a may retrieve the models and fine-tune the machine learning models 111 iteratively based on patient-specific data. The analytics server 110a may retrieve a baseline segmentation model, which is duplicated and fine-tuned for individual patients, physicians, or conditions, as described herein. Various machine learning techniques may involve "training" the machine learning models 111 to generate the segmentations of medical images, including supervised learning techniques, unsupervised learning techniques, or semi-supervised learning techniques, among others.

In a non-limiting example, the segmentations may indicate a region of a medical image that corresponds to a tumor, organ, tissue structure, or other region of interest. The machine learning models 111 can therefore generate labels for regions of a medical image that is provided as input to the machine learning models 111 that indicate the location and boundaries of a region of interest. If multiple different types of regions of interest are present in the medical image, the machine learning models 111 can be trained to generate corresponding labels that indicate the type of the region of interest to which the label in each segmentation corresponds. The segmentations can be generated and displayed by the analytics server 110a in an overlay over the medical image, as described herein.

One type of deep learning engine is a deep neural network (DNN). A DNN is a branch of neural networks and consists of a stack of layers each performing a specific operation, e.g., convolution, pooling, loss calculation, etc. Each intermediate layer receives the output of the previous layer as its input. The beginning layer is an input layer, which is directly connected to or receives input data that includes, for example, a medical image, a segmentation, a hint map, or any other data items described herein, in one or more data structures, and may have a number of neurons equal to the data items provided as input. For example, input data may be formatted into any type of data structure, including a list, vector, matrix, or tensor, among others. Each neuron in an input layer can receive one or more portions of the input data as input. The analytics server 110a may pre-process the input data (e.g., through an encoding process, a normalization process, or other processes).

A next set of layers can include any type of layer that may be present in a DNN, such as a convolutional layer, a fully connected layer, a pooling layer, or an activation layer, among others. Some layers, such as convolutional neural network layers, may include one or more filters. The filters, commonly known as kernels, are of arbitrary sizes defined by designers. Each neuron can respond only to a specific area of the previous layer, called receptive field. The output of each convolution layer can be considered as an activation map, which highlights the effect of applying a specific filter on the input. Convolutional layers may be followed by activation layers to apply non-linearity to the outputs of each layer. The next layer can be a pooling layer that helps to reduce the dimensionality of the convolution's output. In various implementations, high-level abstractions are extracted by fully connected layers. The weights of neural connections and the kernels may be continuously optimized in the training phase.

In practice, training data may be user-generated through observations and experience to facilitate supervised learning. For example, training data may be extracted from past radiotherapy treatments provided to prior patients, historic quality assurance procedures performed on radiotherapy machines, previous mock treatments executed at radiotherapy machines, information produced while testing radiotherapy machines, or other information produced by radiotherapy machines. Training data may be pre-processed via any suitable data augmentation approach (e.g., normalization, encoding, any combination thereof, etc.) to produce a new dataset with modified properties to improve model generalization using ground truth. Ground truth data to train the segmentation models can include segmentations that corresponding to respective input images.

Training the machine learning models 111 may be performed, for example, by performing supervised learning techniques to adjust the parameters of the machine learning models 111 based on a loss computed from the output generated by one or more of the machine learning models 111 and corresponding ground truth data. Inputs to the various machine learning models 111 may include medical images, segmentations generated by other machine learning models, and/or hint maps generated from physician input to correct or refine generated segmentation. Model outputs may include segmentations for the input medical image, which can be displayed as an overlay over the medical image by the analytics server 110a (or by another computing device, such as an end-user device 140).

The analytics server 110a may receive or otherwise access medical images (e.g., MRI scan images or CT scan images) from one or more devices (e.g., medical devices, computers that communication with medical devices, the end-user devices 140, the data sources 120, etc.), which can be provided as input to one or more of the machine learning models 111. The machine learning models 111 can include a baseline segmentation model, which can be trained based on patient-specific data, as described herein. The machine learning models 111 can include additional artificial intelligence models that trained on patient-specific data and hint maps generated based on physician input to the electronic platform. Machine-learning models 111 can be generated (e.g., based on baseline models, as described herein) and trained on a patient-specific basis, a physician-specific basis, a condition-specific basis, or combinations thereof.

To train machine learning models 111 for a specific patient, a baseline segmentation model (and/or an additional model that refines segmentations based on physician hint maps) can be duplicated for the patient, and iteratively trained using data that is specific to that patient (e.g., over a number of treatment fractions, as described herein). The analytics server 110a may execute the machine learning models 111 (e.g., machine learning models trained to generate segmentations based on medical images, etc.) to generate segmentations from medical images. The analytics server 110a may then display the resulting segmentations to a physician via the electronic platform on the administrator computing device 150 and/or the end-user devices 140. The physician can then make adjustments or refinements to the segmentations, if needed, which can be used to further train the machine learning model 111 that is specific to the patient corresponding to the medical image.

The electronic data sources 120 may represent various electronic data sources that contain, retrieve, and/or access data associated with various patients, physician, or training data, which may include medical images captured from MRI scanners or CT scanners, as well as segmentation data generated via manual physician input or by the machine learning models 111. For instance, the analytics server 110a may use the clinic computer 120a, medical professional device 120b, server 120c (associated with a physician and/or clinic), and database 120d (associated with the physician and/or the clinic) to retrieve/receive data medical images or segmentations.

The end-user devices 140 may be any computing device comprising a processor and a non-transitory machine-readable storage medium capable of performing the various tasks and processes described herein. Non-limiting examples of an end-user device 140 may be a workstation computer, laptop computer, tablet computer, and server computer. In operation, various users may use end-user devices 140 to access the GUI operationally managed by the analytics server 110a. Specifically, the end-user devices 140 may include clinic computer 140a, clinic server 140b, and a medical processional device 140c. Even though referred to herein as "end user" devices, these devices may not always be operated by end users. For instance, the clinic server 140b may not be directly used by an end user. However, the results (e.g., medical images, segmentations, etc.) stored onto the clinic server 140b may be used to populate various GUIs accessed by an end user via the medical professional device 140c.

The administrator computing device 150 may represent a computing device operated by a system administrator. The administrator computing device 150 may be configured to display parameters or attributes of the machine learning models 111 generated by the analytics server 110a during the training processes herein. The administrator computing device 150 can monitor various machine learning models 111 utilized by the analytics server 110a, electronic data sources 120, and/or end-user devices 140; review feedback; and/or facilitate training or fine-tuning (calibration) of the machine learning models 111 that are maintained by the analytics server 110a.

Figure 2:
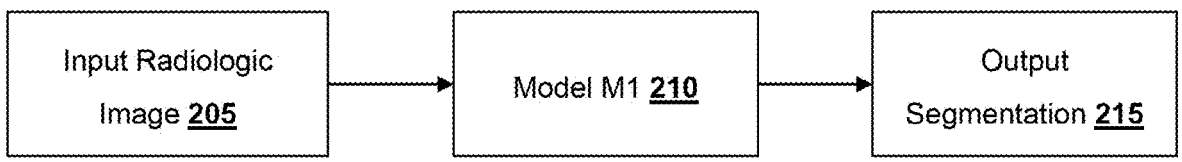
FIG. 2 illustrates an example dataflow diagram of a process for generating a segmentation of a medical image using a machine learning model, according to an embodiment.

FIG. 2 illustrates an example dataflow diagram 200 of a process for generating a segmentation of a medical image using a machine learning model (e.g., a machine learning model 111), according to an embodiment. The process shown in the diagram 200 can be executed by any of the computing devices or systems described herein, including the analytics server 110a or the end-user devices 140, among others. As shown in the diagram 200, a segmentation model 210 (shown as "M1") can receive an input radiologic image 205, and generate an output segmentation 215 of the input radiologic image 205. The input radiologic image 205 can be any medical image of an anatomy of a patient for which segmentations can be generated, including an MRI scan image, a CT scan image, or other types of medical images.

The input radiologic image 205 may be stored in computer memory, and provided as input to the segmentation model 210 in response to an input at a user interface. To execute the segmentation model 210, the processors of the computing device or system can provide the input radiologic image 205 to an input layer of the segmentation model 210, and propagate the data in the input layer through each layer of the model, executing any operations of each layer on the data produced by the preceding layer. The segmentation model 210 may be one of the machine learning models 111 of FIG. 1. The segmentation model 210 can include a final output layer that provides the output segmentation 215. Once generated, the output segmentation 215 can be stored in association with the input radiologic image 205, and can be displayed on a computing system of a physician, who may manually modify the output segmentation 215 via user input.

Figure 3:
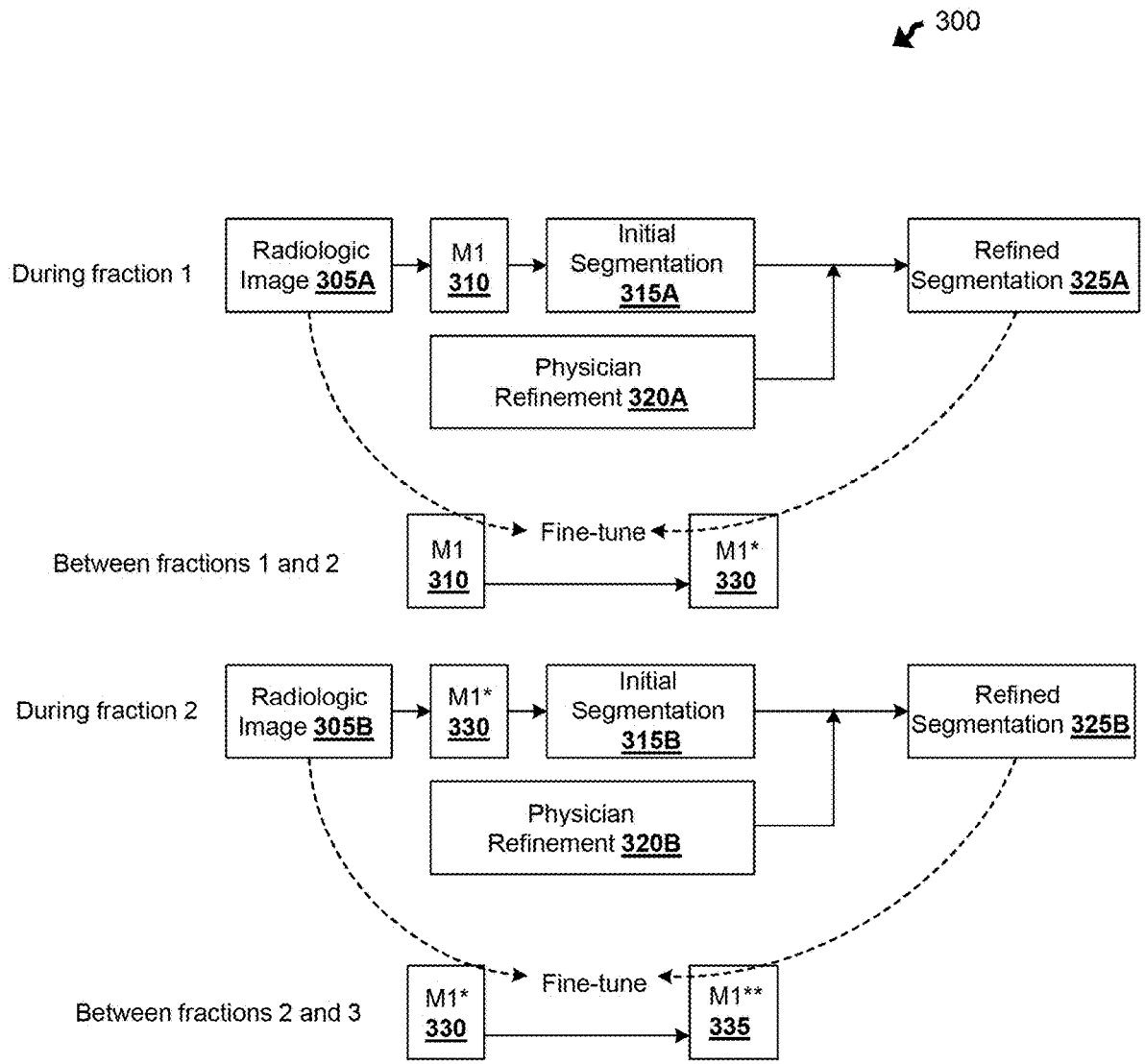
FIG. 3 illustrates an example dataflow diagram of a process for adaptively training machine learning models for auto-segmentation of medical images, according to an embodiment.

FIG. 3 illustrates an example dataflow diagram 300 of a process for adaptively training machine learning models (e.g., one or more of the machine learning models 111) for auto-segmentation of medical images, according to an embodiment. The process shown in the diagram 300 can be executed by any of the computing devices or systems described herein, including the analytics server 110a or the end-user devices 140, among others. As shown in the diagram 300, a radiologic image 305A can be provided as input to a baseline segmentation model 310 (shown as "M1"), as described herein. The baseline segmentation model 310 can be a machine learning model that is pre-trained to generate segmentations based on radiologic images from a baseline patient population. Using the process in the diagram 300, the baseline segmentation model 310 can be trained to generate segmentations more accurately for an individual patient (or patient population) based on physician feedback.

Radiation therapy involves dividing a total dose of radio into smaller doses called fractions. After each dose, medical images (e.g., MRI scan or CT scan images) can be captured from the treatment area to assess treatment progress. To train the model for a specific patient, the baseline segmentation model 310 can first be executed using the radiologic images 305A captured from a patient during a first treatment fraction. The input radiologic image 305A can be any medical image of an anatomy of a patient for which segmentations can be generated, including an MRI scan image, a CT scan image, or other types of medical images. As described herein, the baseline segmentation model 310 is executed to produce an initial segmentation 315A, which can be modified by the physician refinements 320A. The initial segmentation 315A can be stored in association with the radiologic image 305A in computer memory. Because the baseline segmentation model 310 was trained on medical images captured from a baseline patient population (e.g., which does not include the patient actually undergoing treatment), the baseline segmentation model 310 may not generate segmentations that are as accurate as a model that is trained on the specific patient from which the radiologic image 305A was captured.

To execute the baseline segmentation model 310, the processors of the computing device or system can provide the radiologic image 305A to an input layer of the baseline segmentation model 310, and propagate the data in the input layer through each layer of the model, executing any operations of each layer on the data produced by the preceding layer. The baseline segmentation model 310 may be one of the machine learning models 111 of FIG. 1. The baseline segmentation model 310 can include a final output layer that provides the initial segmentation 315A. Once generated, the initial segmentation 315A be displayed on a computing system of a physician (e.g., an end-user device 140), who may manually provide physician refinements 320A.

As described herein, segmentations can include region-specific labels that are assigned to portions of a medical image to indicate a region of interest (e.g., an organ, a tissue structure, a tumor, etc.). Segmentations can indicate three-dimensional regions or two-dimensional regions, depending on the type of medical image provided as input. The physician refinements 320A can include any type of modification to the initial segmentation 315A, including adding a new point to a boundary of the initial segmentation 315A, deleting a point from a boundary of the initial segmentation 315A, modifying a shape of the boundary of the segmentation, or adding a new boundary to the initial segmentation 315A, among others. The physician can provide the physician refinements 320A via input to one or more user interfaces, such as the user interfaces described in connection with FIGS. 7A-7F. Input at the user interfaces can include interactions such as clicks, taps, swipe interactions, drag interactions, or other types of interactions. The physician refinements 320A can be provided via a touch screen display device, via mouse or keyboard interactions, or via another type of input device. The physician refinements 320A (e.g., the interaction data, including interaction coordinates, a record of the type of actions to modify the initial segmentation 315A, etc.) can be stored in association with a patient or physician identifier.

A refined segmentation 325A is the resulting segmentation once the initial segmentation 315A has been modified via the physician refinements 320A. The refined segmentation 325A can be utilized as ground truth data to fine-tune the baseline segmentation model 310 for the patient from which the radiologic image 305A was captured. To do so, the baseline segmentation model 310 can be duplicated and stored as part of a set of machine learning models (e.g., the machine learning models 111). The duplicated model will then be fine-tuned using the refined segmentation 325A, to generate the fine-tuned model 330 (shown as "M1*"). The fine-tuned model 330 is generated by fine-tuning the baseline segmentation model 310 using training data generated based on the refined segmentation 325A. For example, multiple radiologic images 305A may be generated during the first fraction, and corresponding physician refinements 320A can be used to generate a corresponding set of refined segmentations 325A. Each of the refined segmentations 325A can act as ground truth data for the corresponding radiologic image 305A. Training the fine-tuned model 330 can include overfitting the fine-tuned model 330 to these images. In an embodiment, fine-tuning baseline segmentation model 310 may include retraining the baseline segmentation model 310 based these images. Additional training data used to generate the fine-tuned model 330 can be generated using data augmentation techniques. Data augmentation is a set of techniques to artificially increase the amount of data by generating new data points from existing data. Some example data augmentation techniques include position augmentation (e.g., scaling, cropping, padding, rotation, translation, affine transformation), color augmentation (e.g., brightness, contrast, saturation, hue), or adding noise, among others. The fine-tuned model 330 can be trained using a suitable supervised learning process (e.g., calculating a loss function, performing a gradient descent function, etc.).

Once the baseline segmentation model 310 has been fine-tuned on patient-specific data to generate the fine-tuned segmentation model 330, the fine-tuned segmentation model 330 can be utilized to generate segmentations for medical images captured from the patient during later treatment fractions. The same process described herein can be performed to further train the fine-tuned model 330 based on additional physician refinements. For example, additional radiologic images 305B, which are captured from a subsequent treatment fraction involving the same patient from which images were used to generate the fine-tuned model 330, can be provided as input to the fine-tuned model 330 to generate second initial segmentations 315B for the radiologic images 305B. Because the fine-tuned model 330 has been fine-tuned using data that is specific to the patient from which the radiologic images 305B were captured, the resulting initial segmentations 315B will be more accurate (e.g., conform more closely to the patient anatomy and physician preference) than that generated by the baseline segmentation model 310 in the earlier fraction.

As shown, techniques similar to those described herein can be utilized to further train the fine-tuned model 330 and generate a second fine-tuned model 335. The physician refinements 320B can be applied to the initial segmentations 315B generated using the fine-tuned model 330 to generate the corresponding refined segmentations 325B. The refined segmentations 325B can then be used to further train the fine-tuned model 330 and generate the second fine-tuned model 335, which can be used to generate initial segmentations for future treatment fractions. The process can be repeated iteratively for each treatment fraction in which the physician provides additional refinements as described herein. These techniques can be utilized, for example, to generate multiple tailored machine learning models for multiple patients, physicians, or conditions.

Figure 4:
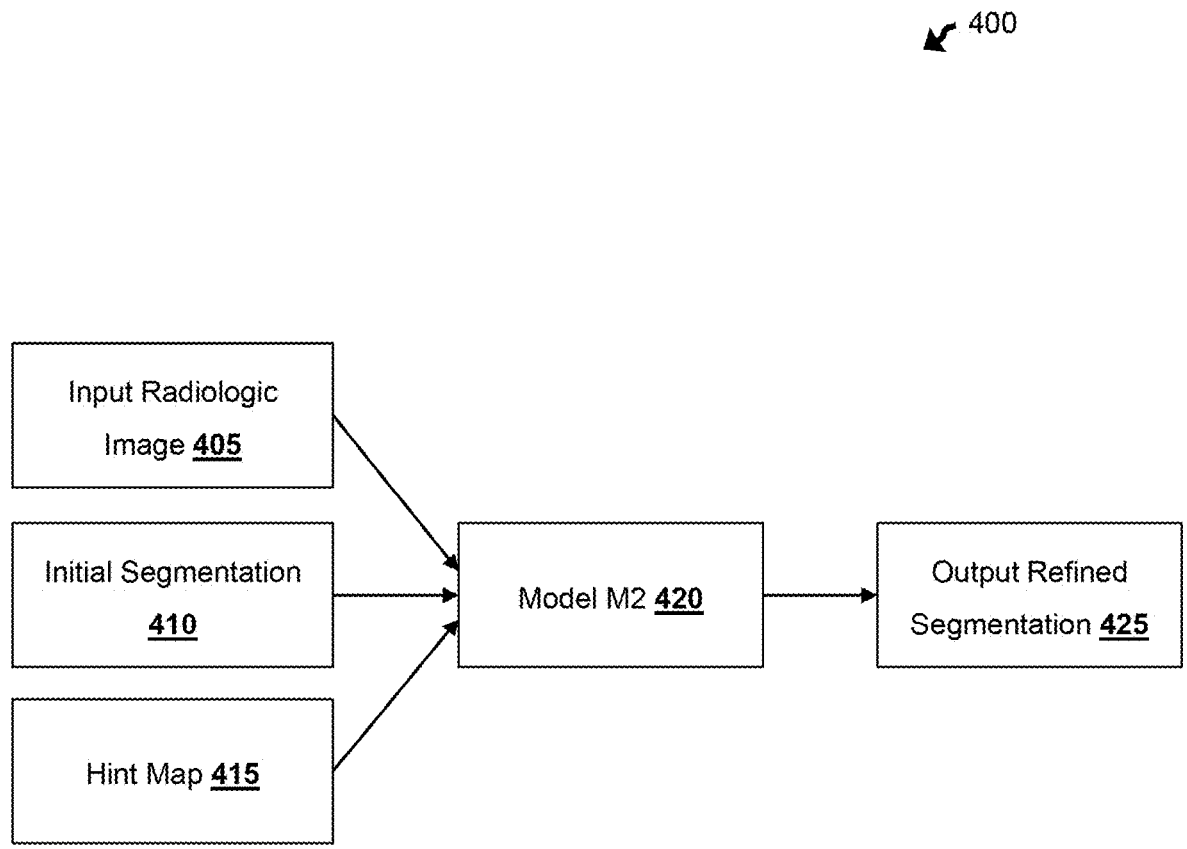
FIG. 4 illustrates an example dataflow diagram of a process for generating a refined segmentation of a medical image using a second machine learning model, according to an embodiment.

FIG. 4 illustrates an example dataflow diagram of a process for generating a refined segmentation of a medical image using an interactive segmentation model (e.g., one of the machine learning models 111), according to an embodiment. The process shown in the diagram 400 can be executed by any of the computing devices or systems described herein, including the analytics server 110a or the end-user devices 140, among others. As shown in the diagram 400, an interactive segmentation model 420 (shown as "M2") can receive input data and generate an output refined segmentation 425 based on the input data. The input data can include an input radiologic image 405, an initial segmentation 410 (e.g., the initial segmentation 315A or 315B), and a hint map 415. The input radiologic image 405 can be any medical image of an anatomy of a patient for which segmentations can be generated, including an MRI scan image, a CT scan image, or other types of medical images.

The initial segmentation 410 may be a segmentation that is generated by another machine learning model (e.g., the segmentation model 310, the fine-tuned segmentation model 330, the second fine-tuned model 335, etc.), and may be stored in computer memory in association with the input radiologic image 405 and the hint map 415. The hint map 415 can include a record of interactions or actions performed by a physician to specify one or more refinements (e.g., the physician refinements 320A or 320B) to correct the initial segmentation 410, as described herein. The corrections can be stored in computer memory in association with the initial segmentation 410, and can be utilized to generate the hint map 415. The hint map 415 can include location data corresponding to the cues to correct the initial segmentation 410, along with the type of action corresponding to each cue (e.g., add a new point to a boundary of the initial segmentation 410, delete a point from a boundary of the initial segmentation 410, modify a shape of the boundary of the initial segmentation 410, or adding a new boundary to the initial segmentation 410, etc.). Any type of cue to correct the initial segmentation 410 can be utilized to generate the hint map 415. The hint map 415 can be a volumetric image having the same dimensions as the input radiologic image 405. The hint map 415 can include distance values from the location of a modification (e.g., an interaction) to correct the initial segmentation 410. The hint map 415 may be a geodesic map or a Gaussian blob map, among others.

The hint maps 415 can be utilized when performing interactive patient-specific training using an interactive segmentation model, as described herein. During interactive segmentation, the physician can interact with a medical image to identify a few sample pixels (sometimes referred to herein as "seed points") that have been misclassified by the segmentation model (e.g., the baseline segmentation model 310). A misclassified pixel may be, for example, a pixel which should have been identified as tumor has been identified as non-tumor or vice-versa. Because it is likely that the classification of pixels around the physician-specified seed points are probably also misclassified, the interactive segmentation model 420 can be trained to perform refinements to an initial baseline segmentation based on these seed points. Data that can be provided as input to the interactive segmentation model can include values corresponding to how far a pixel is from its nearest physician-provided interaction (e.g., the seed point), which is used to determine how to modify the initial segmentation 410 to generate the output refined segmentation 425. The hint map 415 can be utilized to provide said distance values in the form of an image. The hint map 415 of a 2D or 3D image can include an image in which every pixel includes information corresponding to a distance from its nearest seed point.

Figure 5A:
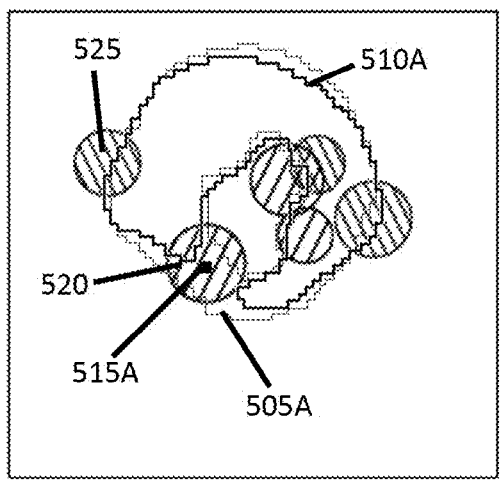
FIGS. 5A and 5B illustrate example hint maps that may be utilized with the interactive segmentation models described herein, according to an embodiment.

The seed points can include a foreground-missed seed point, which is a physician-identified pixel which should have been tumor but is missed by the baseline segmentation model. The seed points can include a background wrongly classified seed point, which is a physician-identified pixel that should have been background (e.g., non-tumor) but was been classified by the baseline segmentation model as a tumor. Each type of seed point can correspond to its own hint map 415. In an embodiment, instead of using pure Euclidean distance of a pixel from its nearest seed point, various approaches can be used to capture properties of the original image or to account for uncertainty. In FIG. 5A a Gaussian blob hint map is shown, and in FIG. 5B, a hint map based on geodesic distances is provided.

Figure 5B:
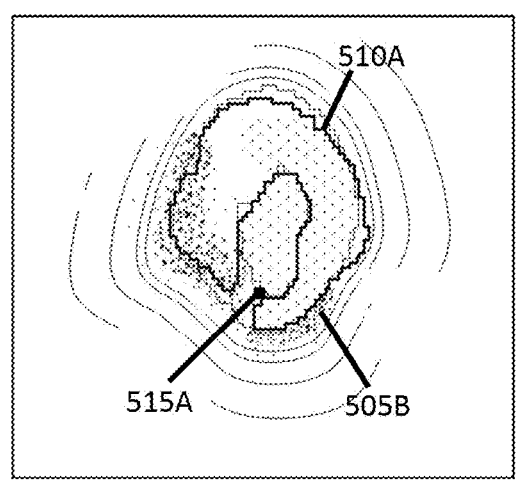

In FIGS. 5A and 5B, the segmentation lines 505A and 505B represent a ground truth segmentation for the tumor outline, and the segmentation lines 510A and 510B indicate the tumor outline predicted by the baseline segmentation model described herein. The square pixels 515A and 515B identify an FG-Missed seed point provided by physician, and a second square pixel (not shown) may identify a BG-WrongC seed point. Now FG-Missed hint map 525 and BG-WrongC hint map 520 can be generated around these two types of seed points by identifying some type of distance from those seed points.

FIG. 5A represents a Gaussian blob hint map, in which a 2D or 3D Gaussian distribution is placed with mean position coinciding with a respective nearest seed point. The standard distribution for the Gaussian distribution can correspond, for example, to 2 to 4 pixels. In the hint map image of FIG. 5A, each pixel value is can be the probability value of such a Gaussian distribution with mean placed at the respective seed point. The blobs 520 and the blobs 525 are the Gaussian distribution around the FG-Missed seed point 515A and BG-Wrong-C seed point (not shown).

FIG. 5B represents a geodesic distance hint map. In FIG. 5B, the pixel value of the hint map is the geodesic distance of the pixel from each seed point (e.g., the FG-Missed seed points 515B). The geodesic distance is the shortest distance based on the gradients of the underlying image (e.g., the CT and PET image). The FG-Missed hint map and the BG-WrongC hint map are generated based on geodesic distance of each pixel from the nearest FG-Missed and BG-WrongC type seed points. In contrast to the Gaussian blob hint maps of FIG. 5A, which are "almost disjoint" due to values falling off to zero beyond the third standard deviation, in FIG. 5B each type of geodesic hint map (e.g. for each type of seed point) are overlapping everywhere. FIG. 5B therefore shows a blended image of two types of hint maps: one for FG-Missed seed points and the other for BG-WrongC seed points.

Referring back to FIG. 4, the hint map 415 is a conversion of the discrete modifications to an initial segmentation 410 into a volumetric image having the same shape as the input radiologic image 405. The hint map 415 shows where the physician has identified errors in the initial segmentation 410. A hint map 415 for an initial segmentation 410 and a corresponding radiologic image 405 can be generated in response to one or more physician refinements (e.g., the physician refinements 320A or 320B), and may be updated for the initial segmentation 410 as the physician provides further refinements via user input. In some embodiments, a respective hint map 415 can be generated for each medical image to which segmentation refinements were applied. In some embodiments, a hint map 415 can be generated from an aggregate of the refinements made to all (or a subset) of segmentations of the medical images of a specific patient that are captured during a particular treatment fraction.

Each of the input radiologic image 405, the initial segmentation 410, and the hint map 415 can be provided as input to the interactive segmentation model 420, which can be executed to generate the refined segmentation 425. To execute the interactive segmentation model 420, the input data can be propagated from the input layer through each layer of the model, executing any operations of each layer on the data produced by the preceding layer. The interactive segmentation model 420 can include a final output layer that provides the output refined segmentation 425. Once generated, the output refined segmentation 425 can be stored in association with the input radiologic image 405, the initial segmentation 410, and the hint map 415, and can be displayed on a computing system of a physician. In an embodiment, the physician may provide further refinements to the output refined segmentation 425 via user input, as described herein.

Figure 6:
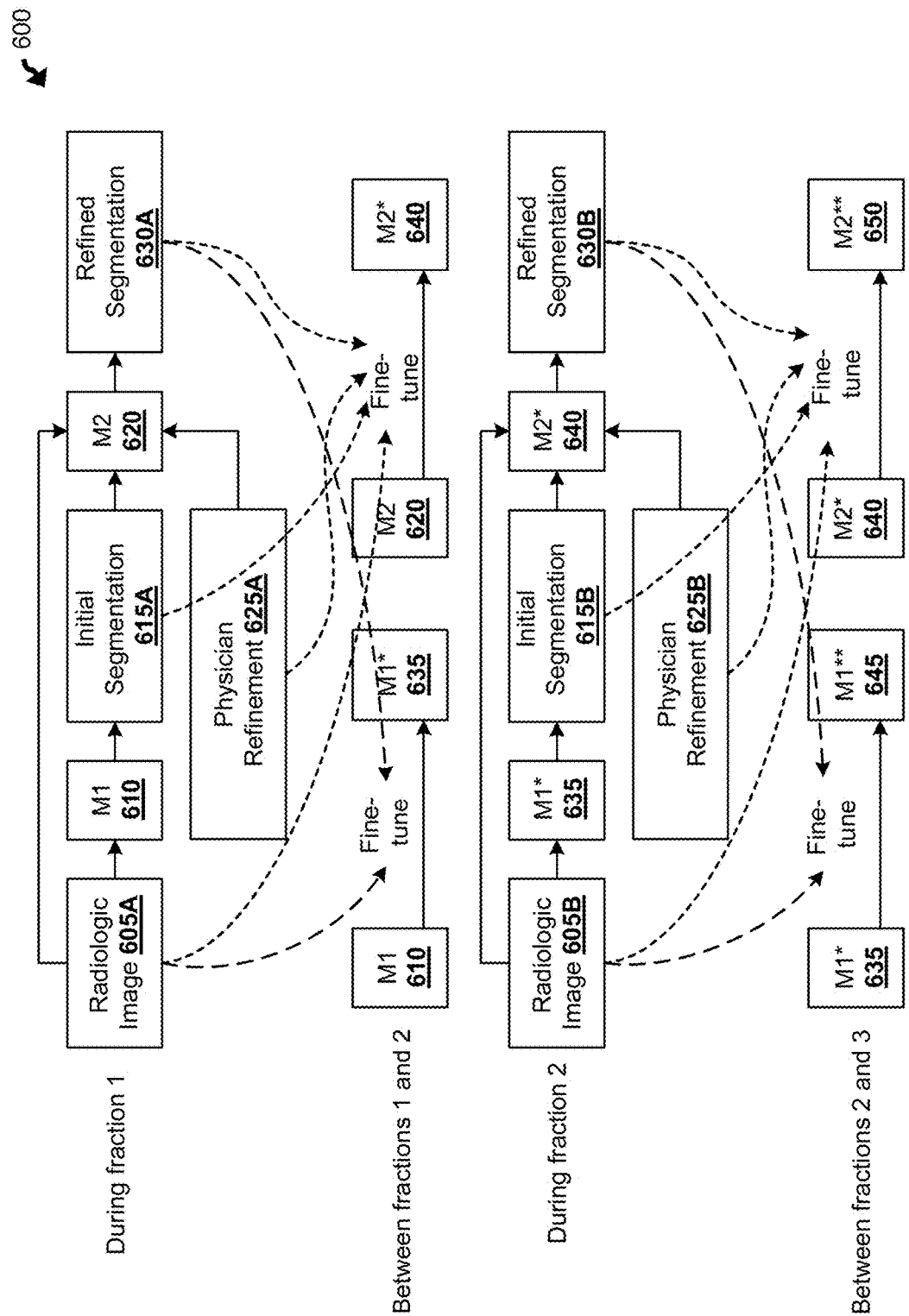
FIG. 6 illustrates an example dataflow diagram of a process for adaptively training multiple machine learning models to generate refined segmentations of medical images, according to an embodiment.

FIG. 6 illustrates an example dataflow diagram 600 of a process for adaptively training multiple machine learning models to generate refined segmentations of medical images, according to an embodiment. The process shown in the diagram 600 may be similar to the process described in connection with FIG. 3, but includes fine-tuning an interactive segmentation model (e.g., the interactive segmentation model 420). The process shown in the diagram 600 can be executed by any of the computing devices or systems described herein, including the analytics server 110a or the end-user devices 140, among others. As shown in the diagram 600, a radiologic image 605A can be provided as input to a baseline segmentation model 610 (shown as "M1"), as described herein. The baseline segmentation model 610 can be a machine learning model that is pre-trained to generate segmentations based on radiologic images from a baseline patient population. The baseline segmentation model 610 may be fine-tuned using the techniques described herein to generate segmentations more accurately for an individual patient (or patient population) based on physician feedback.

The baseline segmentation model 610 is executed to produce an initial segmentation 615A, which can be modified by physician refinement 625A. The initial segmentation 615A can be stored in association with the radiologic image 605A in computer memory. To execute the baseline segmentation model 610, the processors of the computing device or system can provide the radiologic image 605A to an input layer of the baseline segmentation model 610, and propagate the data in the input layer through each layer of the model, executing any operations of each layer on the data produced by the preceding layer. The baseline segmentation model 610 may be one of the machine learning models 111 of FIG. 1. The baseline segmentation model 610 can include a final output layer that provides the initial segmentation 615A. Once generated, the initial segmentation 615A be displayed on a computing system of a physician (e.g., an end-user device 140), who may manually provide refinements 625A.

The physician refinements 625A can include any type of modification to the initial segmentation 615A, including adding a new point to a boundary of the initial segmentation 615A, deleting a point from a boundary of the initial segmentation 615A, modifying a shape of the boundary of the initial segmentation 615A, or adding a new boundary to the initial segmentation 615A, among others. The physician can provide the refinements 625A via input to one or more user interfaces, such as the user interfaces described in connection with FIGS. 7A-7F. Input at the user interfaces can include interactions such as clicks, taps, swipe interactions, drag interactions, or other types of interactions. The physician refinements 625A can be provided via a touch screen display device, via mouse or keyboard interactions, or via another type of input device. The physician refinements 625A (e.g., the interaction data, including interaction coordinates, a record of the type of actions to modify the initial segmentation 315A, etc.) can be stored in association with a patient or physician identifier.

The physician refinements 625A can be used to generate a corresponding hint map (e.g., a hint map 415), which can be provided as input to the interactive segmentation model 620. The hint map can be a geodesic hint map (e.g., such as the geodesic hint map shown in FIG. 5A) or a Gaussian blob hint map (e.g., such as the Gaussian blob hint map shown in FIG. 5B). The hint map can include all of the refinements used to correct the initial segmentation. The physician can provide the physician refinements 625A via input at a user interface.

Once the heat map has been generated, the radiologic image 605A, the initial segmentation 615A, and the hint map can be provided as input to a baseline interactive segmentation model 620 (e.g., the interactive segmentation model 420). The baseline interactive segmentation model 620 can be a machine learning model (e.g., one of the machine learning models 111) that is pre-trained to generate segmentations based on radiologic images, initial segmentations, and hint maps generated from data corresponding to a baseline patient population. The baseline interactive segmentation model 620 can be fine-tuned using the techniques described herein to generate segmentations more accurately for an individual patient (or patient population) based on physician feedback.

The baseline interactive segmentation model 620 is executed using techniques similar to those described herein, and generates the refined segmentation 630A. The physician can then make further refinements to the refined segmentation 630 to generate a ground truth segmentation, which can be utilized as ground truth data to fine-tune the baseline segmentation model 610 and the baseline interactive segmentation model 620 for the patient from which the radiologic image 605A was captured. To do so, the baseline segmentation model 610 and the baseline interactive segmentation model 620 can be duplicated and stored as part of a set of machine learning models (e.g., the machine learning models 111). The duplicated models can then be fine-tuned using the refined segmentation 630A, to generate the fine-tuned segmentation model 635 (shown as "M1*") and a fine-tuned interactive model 640 (shown as "M2*").

The fine-tuned segmentation model 635 and the fine-tuned interactive model 640 are generated by fine-tuning the baseline segmentation model 610 and the baseline interactive segmentation model 620, respectively, using training data generated based on the ground truth segmentation data produced via the further refinements from the physician. For example, multiple radiologic images 605A may be captured during the first fraction of patient treatment, and corresponding physician refinements 625A can be provided as input to the baseline interactive segmentation model 620 to generate a corresponding set of refined segmentations 630A. The physician can then provide further refinements as input to correct the refined segmentations 630A, resulting in ground truth segmentations for each radiologic image 605A. Each of the ground truth segmentations can act as ground truth data for the corresponding radiologic image 605A. Training the fine-tuned segmentation model 635 and the fine-tuned interactive model 640 can include overfitting each of the fine-tuned segmentation model 635 and the fine-tuned interactive model 640 based on the patient-specific data. In an embodiment, fine-tuning the fine-tuned segmentation model 635 and the fine-tuned interactive model 640 can include retraining the fine-tuned segmentation model 635 and the fine-tuned interactive model 640. Additional training data used to train the fine-tuned segmentation model 635 and the fine-tuned interactive model 640 can be generated using data augmentation techniques on the ground truth segmentations, such as position augmentation, color augmentation, or adding noise, among others.

The fine-tuned segmentation model 635 and the fine-tuned interactive model 640 can each be trained using a suitable supervised learning process (e.g., calculating a loss function, performing a gradient descent function, etc.). In some embodiments, all parameters of the fine-tuned segmentation model 635 and the fine-tuned interactive model 640 are considered trainable when fine-tuning the models. In some embodiments, only a subset of the parameters of the fine-tuned segmentation model 635 or the fine-tuned interactive model 640 is trainable, with other parameters remaining static. In some embodiments, only one of the fine-tuned segmentation model 635 or the fine-tuned interactive model 640 is fine-tuned based on the patient-specific data and the other model remains static and is not fine-tuned. Similar techniques may also be utilized to fine-tune the models using patent-specific images captured prior to the first treatment fraction.

Once the baseline segmentation model 610 and the baseline interactive segmentation model 620 have been fine-tuned on patient-specific data to generate the fine-tuned segmentation model 635 and the fine-tuned interactive model 640, each of the fine-tuned segmentation model 635 and the fine-tuned interactive model 640 can be utilized to generate segmentations for medical images captured from the patient during later treatment fractions. Similar operations can be performed to further train the fine-tuned segmentation model 635 and the fine-tuned interactive model 640 based on additional physician refinements. For example, additional radiologic images 605B, which are captured from a subsequent treatment fraction involving the same patient from which images were used to generate the fine-tuned segmentation model 635 and the fine-tuned interactive model 640, can be provided as input to the fine-tuned segmentation model 635 to generate second initial segmentations 615B for the radiologic images 605B.

The initial segmentations 615B, a hint map (e.g., the hint map 415) generated from the additional physician refinements 625B, and the radiologic image 605B can be provided as input to the fine-tuned interactive model 640 to generate the refined segmentation 630B. The refined segmentation 630B (and additional physician refinements) can be used to further train the fine-tuned segmentation model 635 and the fine-tuned interactive model 640 and generate a second fine-tuned model 645 and a second fine-tuned interactive model 650 (shown as "M2**"), using techniques similar to those described above. The process can be repeated iteratively for each treatment fraction in which the physician provides additional refinements as described herein. These techniques can be utilized, for example, to generate multiple tailored machine learning models for multiple patients, physicians, or conditions.

FIGS. 7A-7F illustrate example user interfaces that present information relating to the segmentation of medical images for radiotherapy treatment, according to an embodiment. The user interfaces may be displayed by a computing device (e.g., an end-user device 140) executing a native segmentation application, or via an application provided by a server (e.g., the analytics server 110a).

Figure 7A:
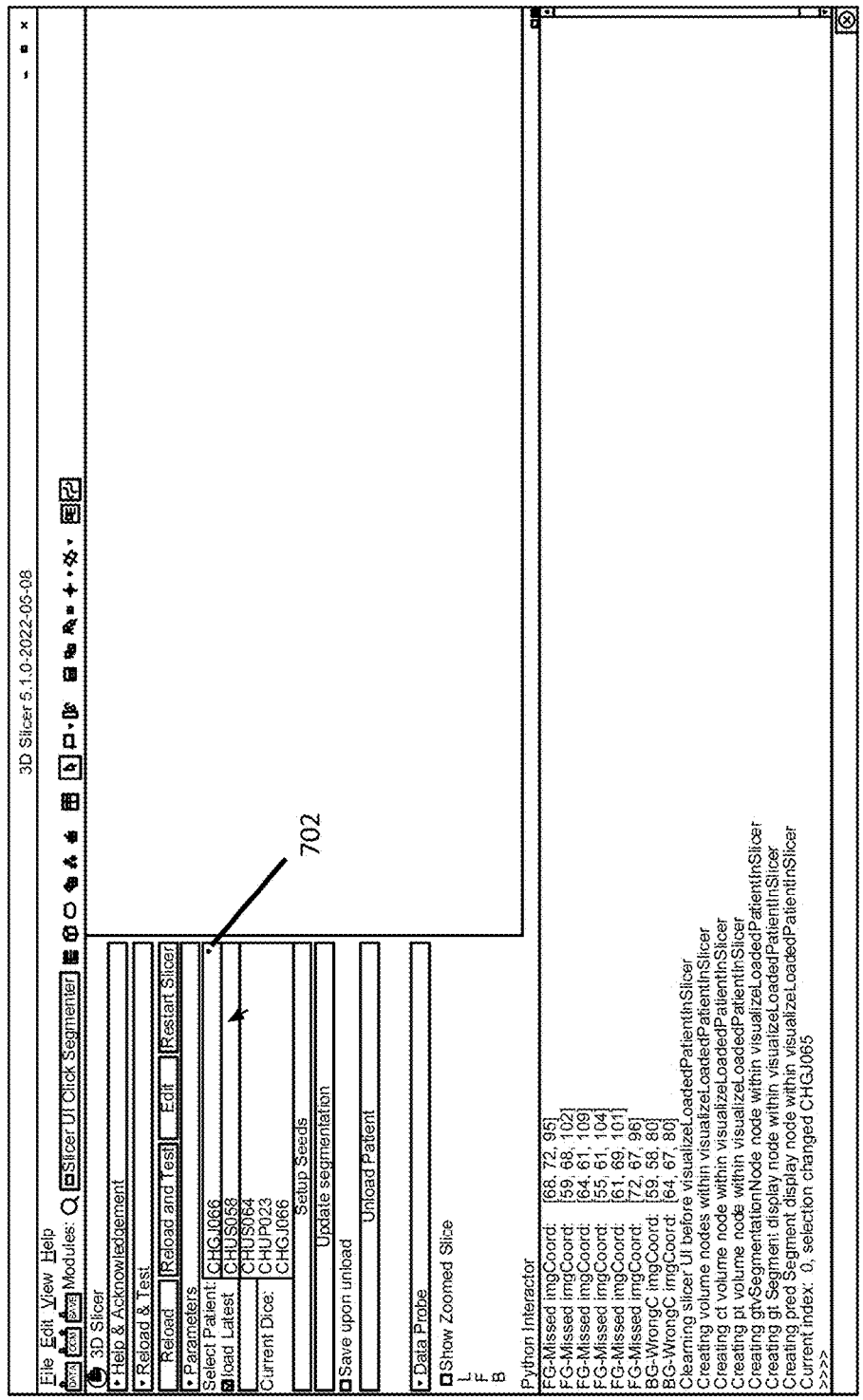
FIGS. 7A-7F illustrate example user interfaces that present information relating to the segmentation of medical images for radiotherapy treatment, according to an embodiment.

FIG. 7A shows an example user interface 700A in which segmentations can be generated and modified according to the various embodiments described herein. The user interface 700A can be utilized to display medical images (e.g., MRI scan or CT scan images) of a patient. Segmentations that are generated using the techniques described herein can be displayed in the user interface 700A as an overlay over the medical images, once displayed. A physician can select data (e.g., medical image(s), patient-specific data, etc.) by interacting with the user interface elements 702, shown here as a dropdown menu.

Figure 7B:
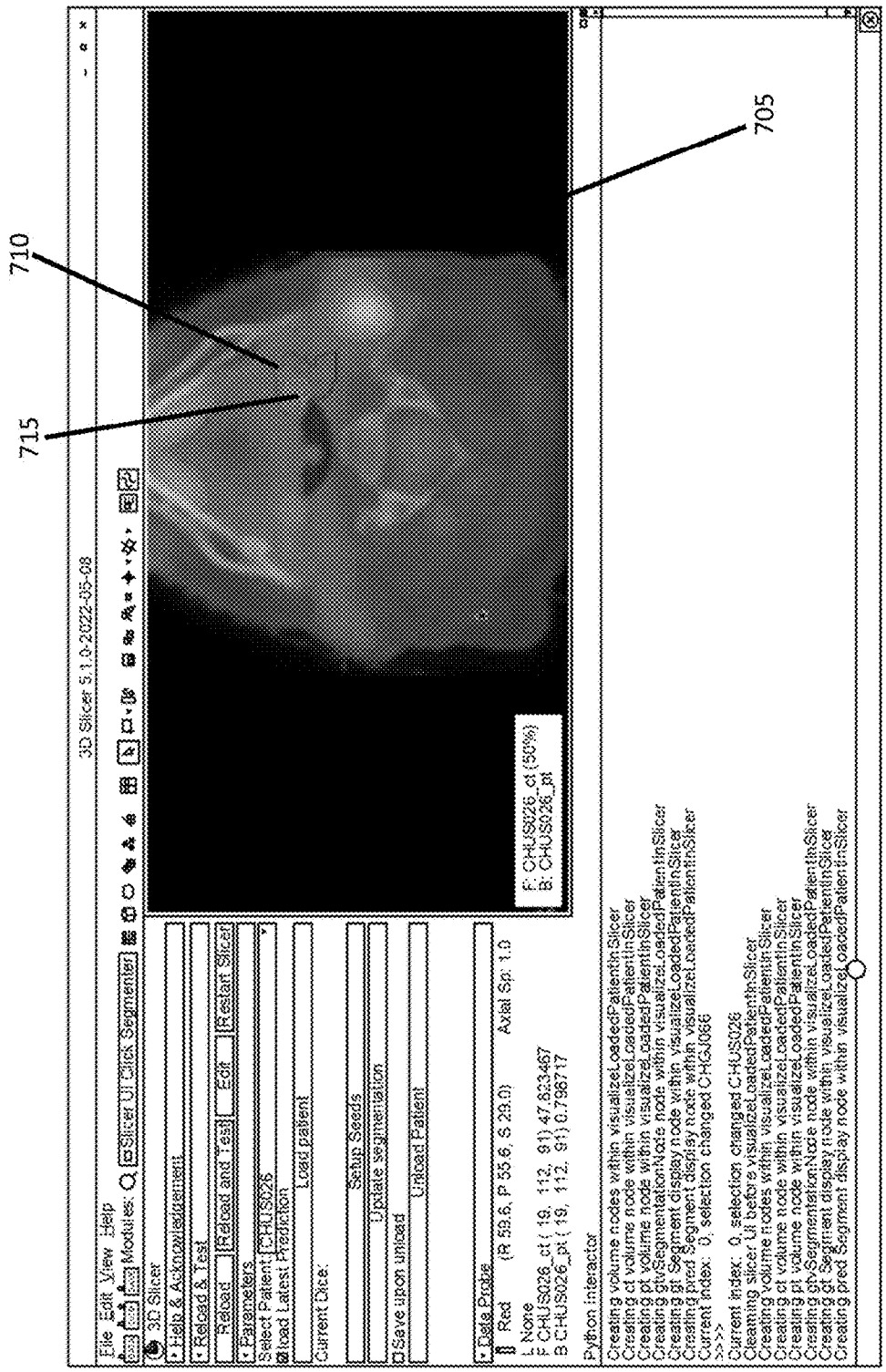

FIG. 7B shows an example user interface 700B, in which a medical image 705 has been loaded and provided as input to a segmentation model (e.g., one or more of the machine learning models 111) described herein. The medical image 705 can be selected for display by interacting with one or more interactive elements 702 of the user interface 700A shown in FIG. 7A. Once the medical image has been loaded, the computing system providing the user interface 700B (or another computing system in communication with the computing system providing the user interface 700B) can execute a segmentation model using the medical image as input. The resulting segmentation can be shown as an overlay over the medical image. The example medical image shown in the user interface 700B in this example is already associated with training data. The outer boundary 710 overlaid on the medical image corresponds to the actual segmentation (e.g., ground truth) of a tumor, and the inner boundary 715 corresponds to an initial segmentation generated by the machine learning model as described herein.

Figure 7C:
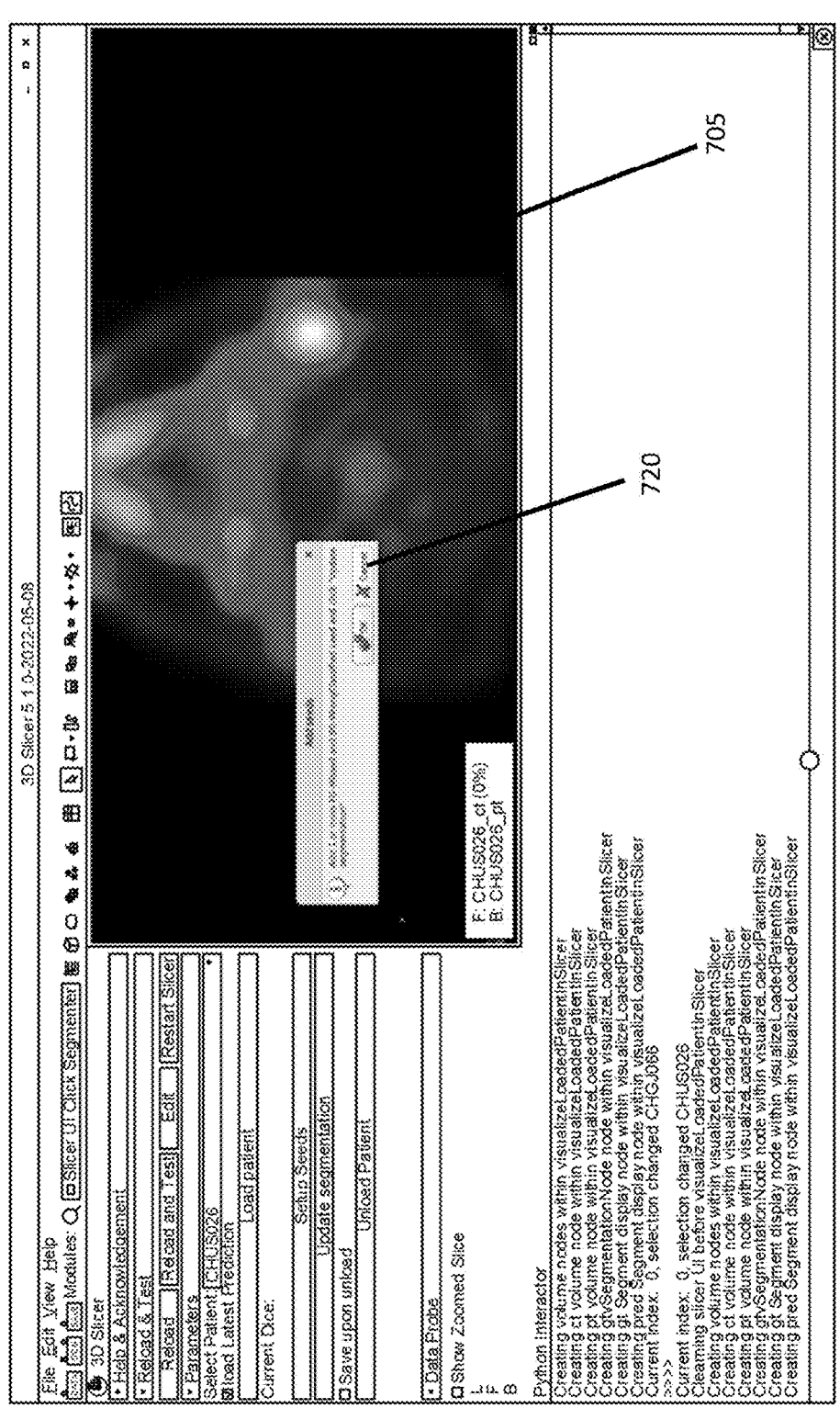

FIG. 7C shows an example user interface 700C, in which a physician is prompted to provide refinements to the automatically generated segmentation for the medical image 705. As shown, a notification 720 is displayed that prompts the physician to indicate "Foreground Missed (FG-missed)" and "Background Wrongly Classified (BG=WrongC)" points on the boundary of the automatically generated segmentation.

Figure 7D:
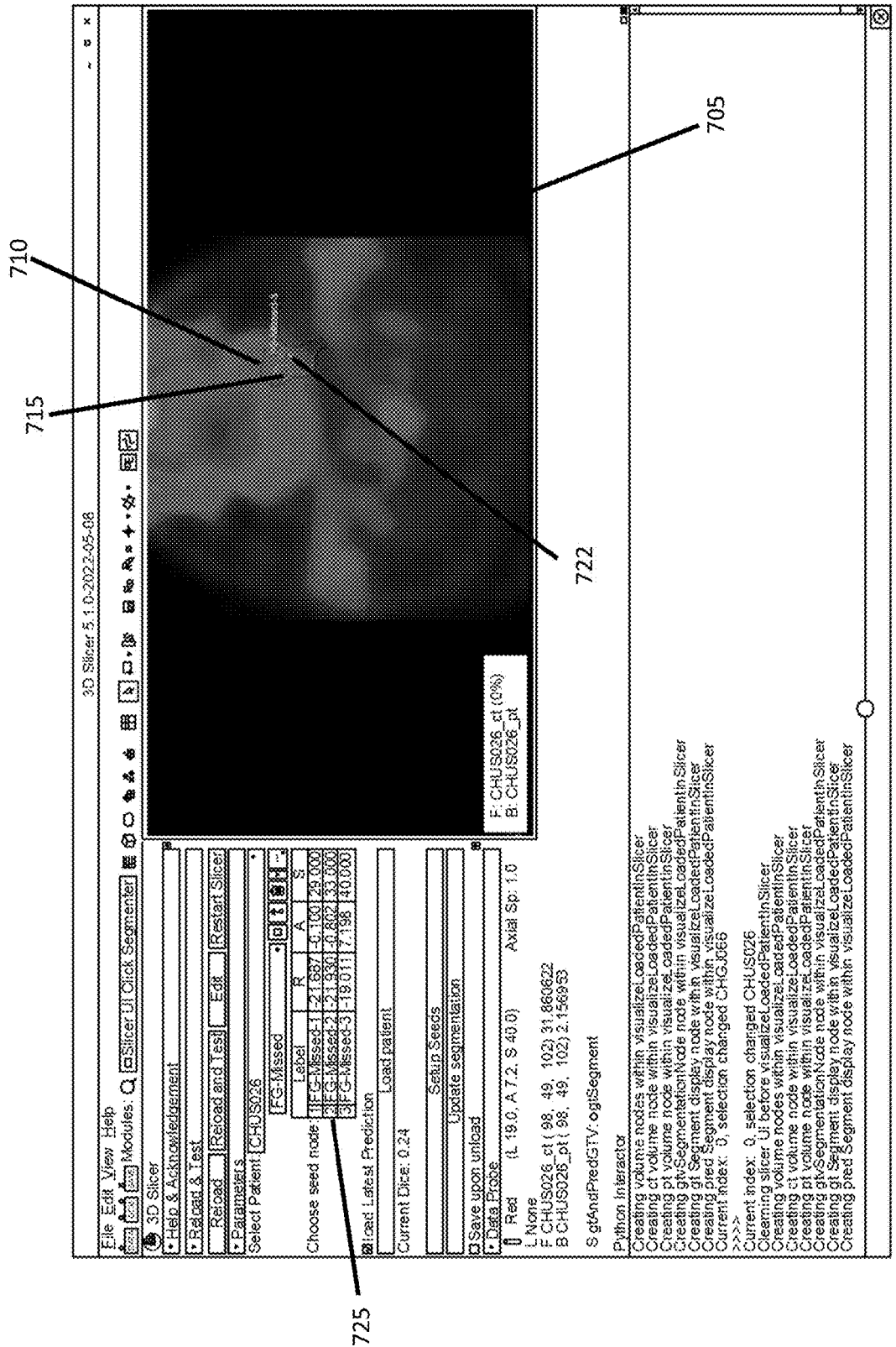

FIG. 7D shows an example user interface 700D in which the physician has added one or more Foreground Missed seed points 722 over the medical image 705, indicators of which are shown in display pane 725. Foreground Missed seed points are points outside of the automatically generated boundary 715 that physician believes corresponds to a tumor or other region of interest that should be associated with the segmentation (e.g., expanding the boundary of the segmentation, and therefore within the ground truth outer boundary 710). The physician can interact with the user interface 700D to provide multiple refinements or adjustments to the segmentations generated by the machine-learning model.

Figure 7E:
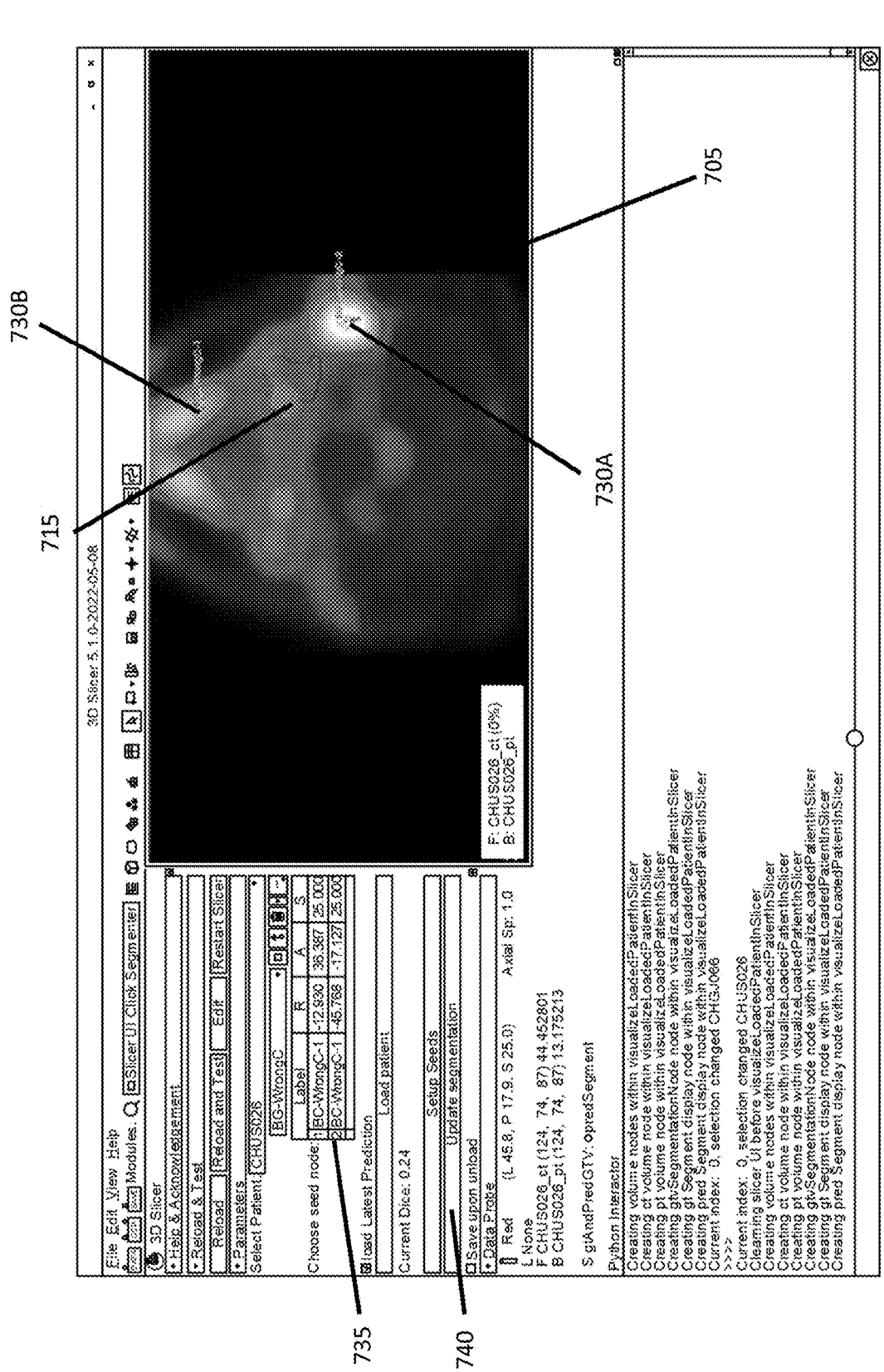

FIG. 7E shows an example user interface 700E in which the physician has added the Background Wrongly Classified points 730A and 730B over the medical image 705. The Background Wrongly Classified points 730A and 730B are points that the physician believes are not of interest, but were incorrectly included as part of the segmentation. These points are outside of the ground truth region indicated by the boundary 715. Indicators of the points are shown in the display pane 735. Each of these refinements can be recorded as part of the physician interactions used to generate the various hint maps described herein. Once the physician has made any suitable modifications to the segmentations generated by the machine learning model, the physician can interact with the "Update Segmentations" button 740 to execute a second machine learning model (e.g., the interactive segmentation model 620), which generates a refined segmentation based on the techniques described herein.

Figure 7F:
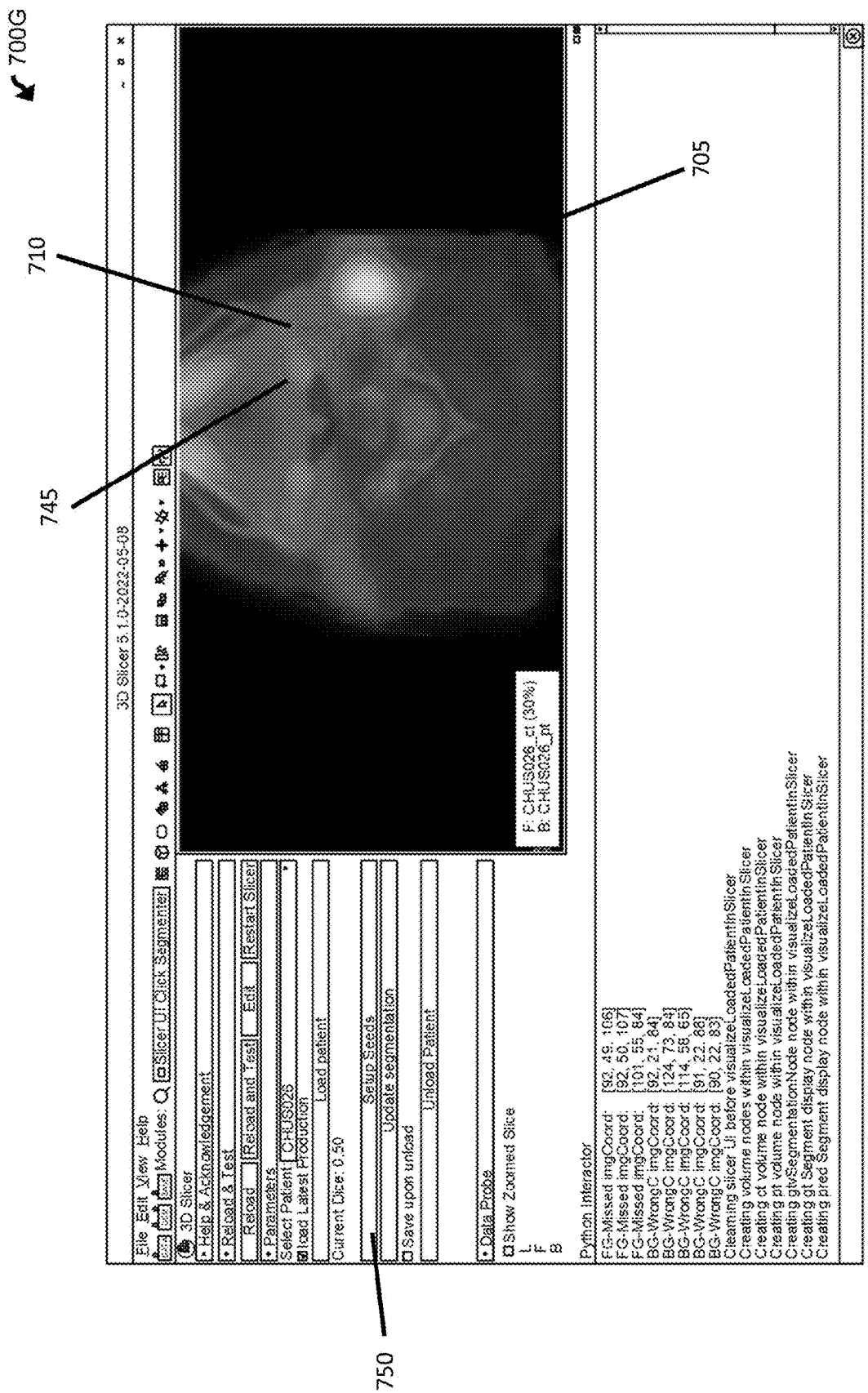

FIG. 7F shows an example user interface 700F, in which displays a refined segmentation generated by the second machine learning model as an overlay on the medical image 705. As described herein, the previously generated initial segmentation, the hint map corresponding to physician input, and the radiologic image are provided as input to the trained interactive segmentation model, which generates the refined segmentation. In this example, the updated segmentation (the inner boundary 745 shown in the user interface 700F) more closely conforms to the actual segmentation (the outer boundary 710 shown in the user interface 700F), indicating that the automatically generated segmentation is more accurate with respect to the input data. The physician can then select the "Setup Seeds" button to provide further refinements to the segmentations, which can be utilized to further train the machine learning models as described herein.

Figure 8:
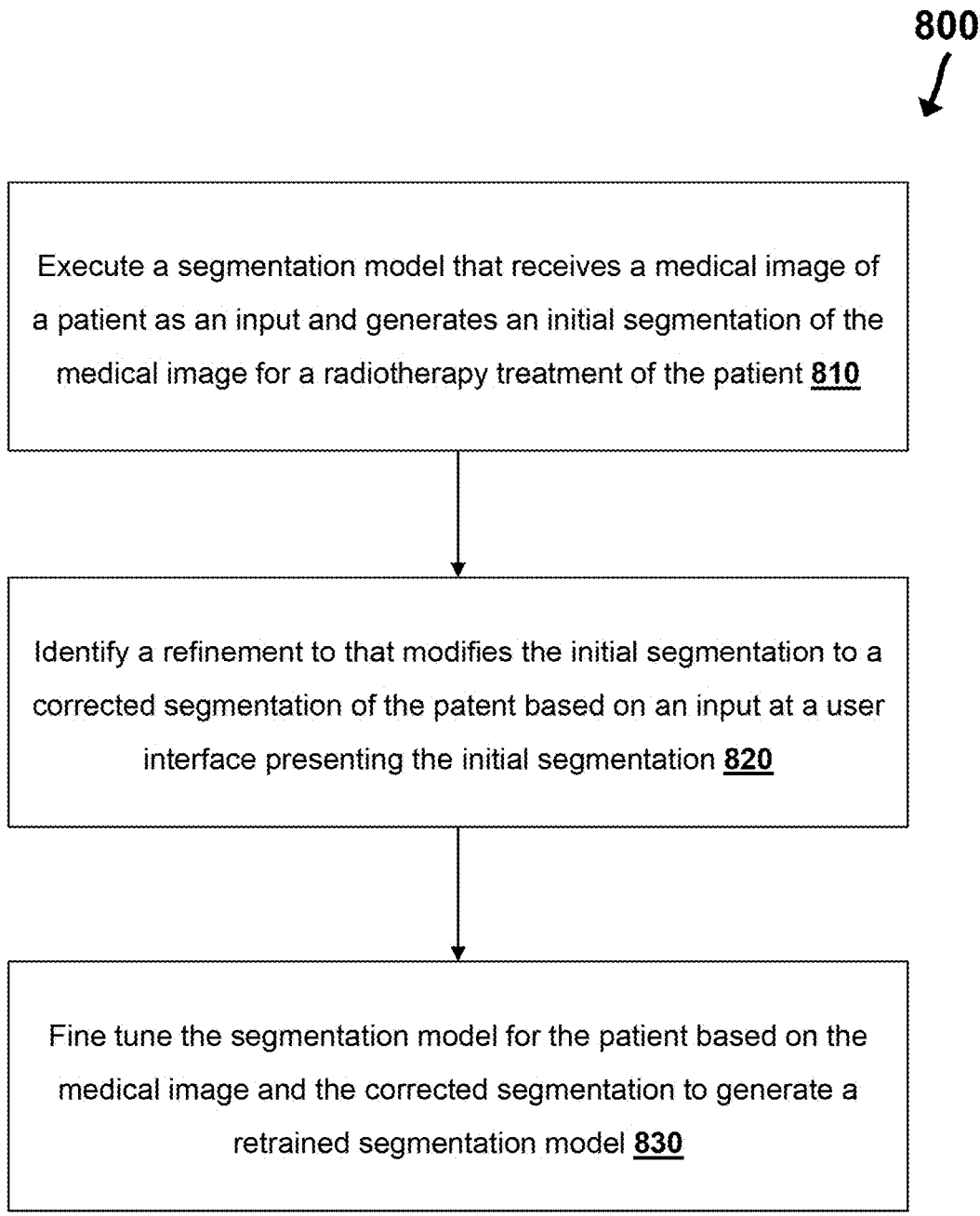
FIG. 8 illustrates an example flow diagram of method executed in a system for adaptively training machine learning models for auto-segmentation of medical images, according to an embodiment.

FIG. 8 illustrates an example flow diagram of method executed in a system for adaptively training machine learning models for auto-segmentation of medical images, according to an embodiment. The method 800 may include steps 810-830. However, other embodiments may include additional or alternative steps, or may omit one or more steps altogether. The method 800 is described as being executed by a data processing system (e.g., a computer similar to the analytics server 110a, the data source 120, the end-user device 140, or the administrator computing device 150, described in FIG. 1). However, one or more steps of method 800 may be executed by any number of computing devices operating in the distributed computing system described in FIG. 1. For instance, one or more computing devices may locally perform part or all of the steps described in FIG. 8 or a cloud device may perform such steps.

At step 810, a data processing system (e.g., the analytics server 110a, the electronic data source 120, the end-user device 140, or the administrator computing device 150) may execute a segmentation model (e.g., the segmentation model 310, the segmentation model 610, etc.) that receives a medical image (e.g., an MRI scan or a CT scan image) as input and generates an initial segmentation (e.g., the initial segmentation 315A, the initial segmentation 615A) of the medical image for a radiotherapy treatment. The segmentation model can be a machine learning model that is pretrained to generate segmentations based on radiologic images from a baseline patient population. The segmentation model can be fine-tuned to generate segmentations more accurately for an individual patient (or patient population) based on physician refinements.

To execute the segmentation model, the data processing system can provide the medical image to an input layer of the segmentation model, and propagate the data in the input layer through each layer of the model, executing any operations of each layer on the data produced by the preceding layer. The segmentation model can include any number of layers that may correspond to any type of operation, including convolutional operations, multiplication operators, or activation layers, among others. The segmentation model can include a final output layer that provides the initial segmentation for the medical image. Once generated, the initial segmentation can be displayed on a display of a computing system of a physician (e.g., an end-user device 140) or on a display of the data processing system.

At step 820, the data processing system may identify a refinement (e.g., the physician refinements 320A, the physician refinements 625A, etc.) to that modifies the initial segmentation to a corrected segmentation (e.g., the refined segmentation 325A, the refined segmentation 630A) based on an input at a user interface presenting the initial segmentation. As described herein, segmentations can include region-specific labels that are assigned to portions of a medical image to indicate a region of interest (e.g., an organ, a tissue structure, a tumor, etc.). Segmentations can indicate three-dimensional regions or two-dimensional regions, depending on the type of medical image provided as input. The physician refinements can include any type of modification to the initial segmentation, including adding a new point to a boundary of the initial segmentation, deleting a point from a boundary of the initial segmentation, modifying a shape of the boundary of the segmentation, or adding a new boundary to the initial segmentation, among others. The physician can provide the refinements via input to one or more user interfaces, such as the user interfaces described in connection with FIGS. 7A-7F.

Input at the user interfaces can include interactions such as clicks, taps, swipe interactions, drag interactions, or other types of interactions. The physician refinements can include Foreground Missed points or Background Wrongly Classified points, as described herein. The physician refinements can be provided via a touch screen display device, via mouse or keyboard interactions, or via another type of input device. The physician refinements (e.g., the interaction data, including interaction coordinates, a record of the type of actions to modify the initial segmentation, etc.) can be stored in association with a patient or physician identifier. The physician refinements can include any type of cue to correct the initial segmentation (e.g., indications of Foreground Missed and Background Wrongly Classified points, etc.). The data processing system can store the refined segmentation (e.g., the segmentation resulting from the physician refinements to the initial segmentation) in association with the input medical image.

Identifying the physician refinements can include receiving the refinements via an input device, or receiving indications of the interactions from an end-user device. In some embodiments, the data processing system can generate a hint map based on the physician refinements to the initial segmentation. The hint map can include a record of interactions or actions performed by a physician to specify one or more refinements (e.g., the physician refinements 320A or 320B) to correct the initial segmentation generated by the segmentation model, as described herein. The corrections can be stored in computer memory in association with the initial segmentation, and can be utilized to generate the hint map. The hint map can include location data corresponding to the cues to correct the initial segmentation, along with the type of action corresponding to each cue (e.g., add a new point to a boundary of the initial segmentation, delete a point from a boundary of the initial segmentation, modify a shape of the boundary of the initial segmentation, or adding a new boundary to the initial segmentation, etc.). Any type of cue to correct the initial segmentation can be utilized to generate the hint map (e.g., indications of Foreground Missed and Background Wrongly Classified points, etc.). The hint map can be a volumetric image having the same dimensions as the input radiologic image. The hint map can include distance values from the location of a modification (e.g., an interaction) to correct the initial segmentation. The hint map may be a geodesic map or a Gaussian blob map, among others.

At step 830, the data processing system may fine-tune the segmentation model based on the medical image and the corrected segmentation to generate a fine-tuned segmentation model (e.g., the fine-tuned model 330, the fine-tuned segmentation model 635A, etc.). The refined segmentation can be utilized as ground truth data to fine-tune the segmentation model for the patient from which the radiologic image was captured. To do so, the segmentation model can be duplicated and stored as part of a set of machine learning models, with the duplicated model being fine-tuned using the refined segmentation generated in step 820, to generate the fine-tuned segmentation model.

The fine-tuned segmentation model is generated by fine-tuning the segmentation model using training data generated based on the refined segmentation. For example, multiple radiologic images may be generated during a first treatment fraction for a patient, and corresponding physician refinements can be used to generate a corresponding set of refined segmentations. Each of the refined segmentations can act as ground truth data for the corresponding radiologic image. Fine-tuning the segmentation model can include overfitting the fine-tuned segmentation model to these images. In an embodiment, fine-tuning the segmentation model may include retraining the segmentation model based on these images. Additional training data for fine-tuning can be generated using data augmentation techniques. Some example data augmentation techniques include position augmentation (e.g., scaling, cropping, padding, rotation, translation, affine transformation), color augmentation (e.g., brightness, contrast, saturation, hue), or adding noise, among others. The model can be fine-tuned using a suitable supervised learning process (e.g., calculating a loss function, performing a gradient descent function, etc.).

Once the segmentation model has been fine-tuned on patient-specific data to generate the fine-tuned segmentation model, the fine-tuned segmentation model can be utilized to generate segmentations for medical images captured from the patient during later treatment fractions. The same process described herein can be performed to further train the fine-tuned model based on additional physician refinements. For example, additional radiologic images, which are captured from a subsequent treatment fraction involving the same patient from which images were used to generate the fine-tuned model, can be provided as input to the fine-tuned model to generate second initial segmentations for the radiologic images. Because the fine-tuned model has been fine-tuned using data that is specific to the patient from which the radiologic images were captured, the resulting initial segmentations will be more accurate (e.g., conform more closely to the patient anatomy and physician preference) than that generated by the baseline segmentation model in the earlier fraction.

In some embodiments, an interactive segmentation model (e.g., the interactive segmentation model 420, the interactive segmentation model 620, etc.) can be utilized to generate an output refined segmentation. In such embodiments, the interactive segmentation model can receive input data and generate a refined segmentation based on the input data. The input data can include an input radiologic image, the initial segmentation generated in step 810, and the hint map generated in step 820. The input radiologic image can be any medical image of an anatomy of a patient for which segmentations can be generated, including an MRI scan image, a CT scan image, or other types of medical images. The second interactive model can be executed as described herein to generate a refined segmentation based on the input data. The second interactive model can be trained to be patient-specific, and to reduce the overall number of physician interactions required to correct segmentations generated by the segmentation model.

Using techniques similar to those described herein with respect to the segmentation model, the interactive segmentation model can be fine-tuned to be patient-specific based on the physician refinements to the initial segmentation and additional refinements to the refined segmentations, as described herein. In embodiments utilizing the interactive segmentation model, both the segmentation model and the interactive segmentation model can be trained in parallel and based on the same physician refinements made to the same input images. Data augmentation can be utilized to increase the size of the training set for fine-tuning the interactive segmentation model, as described herein. The interactive model can be fine-tuned using a suitable supervised learning process (e.g., calculating a loss function, performing a gradient descent function, etc.). In some embodiments, all parameters of the interactive segmentation model are considered trainable during fine-tuning. In some embodiments, only a subset of the parameters of the interactive segmentation model is considered trainable during fine-tuning, with other parameters remaining static. In some embodiments, only one of the segmentation model or the interactive segmentation model are fine-tuned based on the patient-specific data and the other model remains static and is not fine-tuned. Similar techniques may also be utilized to fine-tune the models using patent-specific images captured prior to the first treatment fraction.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method, comprising:
   executing, by one or more processors coupled to a non-transitory memory, a first segmentation model that receives a medical image of a patient as an input and generates an initial segmentation of the medical image for a radiotherapy treatment of the patient;
   identifying, by the one or more processors, a refinement to the initial segmentation generated in response to an input at a user interface presenting the initial segmentation;
   executing, by the one or more processors, a second segmentation model that receives the medical image, the initial segmentation of the medical image, and the refinement as input and generates a refined segmentation of the medical image;
   identifying, by the one or more processors, a correction to the refined segmentation of the medical image;
   fine-tuning, by the one or more processors, the first segmentation model for the patient based on the medical image and the correction to the refined segmentation to generate a first fine-tuned segmentation model; and
   fine-tuning, by the one or more processors, the second segmentation model for the patient based on the medical image, the initial segmentation, and the correction to the refined segmentation to generate a second fine-tuned segmentation model.

2. The method of claim 1, further comprising:
   executing, by the one or more processors, the first fine-tuned segmentation model to generate a second segmentation of a second image; and
   fine-tuning, by the one or more processors, the first fine-tuned segmentation model based on the second image and a second corrected segmentation corresponding to the second segmentation.

3. The method of claim 2, wherein the medical image is a first radiology image of an anatomy of the patient, and the second image is a second radiology image of the anatomy of the patient.

4. The method of claim 1, further comprising generating, by the one or more processors, a hint map based on the input at the user interface, wherein the second segmentation model generates the refined segmentation of the medical image based on the medical image, the initial segmentation, and the hint map.

5. The method of claim 1, further comprising:
   executing, by the one or more processors, the first fine-tuned segmentation model to generate a second segmentation of a second image; and
   fine-tuning, by the one or more processors, the second segmentation model based on the second segmentation and a second input at the user interface.

6. The method of claim 1, wherein the input at the user interface comprises a modification of the initial segmentation.

7. The method of claim 1, wherein the medical image is a radiology image of an anatomy of the patient.

8. The method of claim 1, further comprising generating, by the one or more processors, the user interface that presents the initial segmentation responsive to executing the first segmentation model.

9. The method of claim 1, further comprising generating, by the one or more processors, the refined segmentation in response to the input at the user interface indicating the refinement.

10. A system, comprising:
    one or more processors coupled to a non-transitory memory, the one or more processors configured to:

execute a first segmentation model that receives a medical image of a patient as an input and generates an initial segmentation of the medical image for a radiotherapy treatment of the patient;

identify a refinement to the initial segmentation generated in response to an input at a user interface presenting the initial segmentation;

execute a second segmentation model that receives the medical image, the initial segmentation of the medical image, and the refinement as input and generates a refined segmentation of the medical image;

identify a correction to the refined segmentation of the medical image;

fine-tune the first segmentation model for the patient based on the medical image and the refined segmentation to generate a first fine-tuned segmentation model; and fine-tune the second segmentation model for the patient based on the medical image, the initial segmentation, and the correction to the refined segmentation to generate a second fine-tuned segmentation model.

11. The system of claim 10, wherein the one or more processors are further configured to:

execute the first fine-tuned segmentation model to generate a second segmentation of a second image; and fine-tune the first fine-tuned segmentation model based on the second image and a second corrected segmentation corresponding to the second segmentation.

12. The system of claim 11, wherein the medical image is a first radiology image of an anatomy of the patient, and the second image is a second radiology image of the anatomy of the patient.

13. The system of claim 10, wherein the one or more processors are further configured to generate a hint map based on the input at the user interface, wherein the second segmentation model generates the refined segmentation of the medical image based on the medical image, the initial segmentation, and the hint map.

14. The system of claim 10, wherein the one or more processors are further configured to:

execute the first fine-tuned segmentation model to generate a second segmentation of a second image; and fine-tune the second segmentation model based on the second segmentation and a second input at the user interface.

15. The system of claim 10, wherein the input at the user interface comprises a modification of the initial segmentation.

16. The system of claim 10, wherein the medical image is a radiology image of an anatomy of the patient.

17. The system of claim 10, wherein the one or more processors are further configured to generate the user interface that presents the initial segmentation responsive to executing the first segmentation model.

18. The system of claim 10, wherein the one or more processors are further configured to generate the refined segmentation in response to the input at the user interface indicating the refinement.

* * * * *